US 6,627,376 B1

(12) United States Patent
Ueno

(10) Patent No.: US 6,627,376 B1
(45) Date of Patent: Sep. 30, 2003

(54) STEREOLITHOGRAPHIC APPARATUS AND METHOD FOR MANUFACTURING THREE-DIMENSIONAL OBJECT WITH PHOTOHARDENABLE RESIN

(75) Inventor: Takakuni Ueno, Kanagawa (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 09/557,257

(22) Filed: Apr. 24, 2000

(30) Foreign Application Priority Data

Apr. 27, 1999 (JP) .......................... P11-119370
Aug. 26, 1999 (JP) .......................... P11-239276

(51) Int. Cl.$^7$ .............................. G03C 9/08; G03F 7/26; B29C 35/08; B29B 13/08
(52) U.S. Cl. ...................... 430/269; 430/273.1; 430/5; 264/401; 425/112; 425/174.4; 425/375
(58) Field of Search ........................ 430/5, 269, 273.1; 264/401; 425/112, 174.4, 375

(56) References Cited

U.S. PATENT DOCUMENTS

| | | | | |
|---|---|---|---|---|
| 4,298,680 A | * | 11/1981 | Bruno ........................ | 430/300 |
| 4,456,448 A | * | 6/1984 | Pippert ...................... | 425/234 |
| 4,752,498 A | * | 6/1988 | Fudim ....................... | 425/174.4 |
| 4,885,223 A | * | 12/1989 | Enoki et al. ................ | 430/122 |
| 5,143,817 A | * | 9/1992 | Lawton et al. .............. | 430/269 |
| 5,171,490 A | * | 12/1992 | Fudim ....................... | 425/174.4 |
| 5,248,249 A | * | 9/1993 | Yamamoto et al. ......... | 425/174.4 |
| 5,352,310 A | | 10/1994 | Natter ....................... | 156/155 |
| 5,607,540 A | * | 3/1997 | Onishi ....................... | 156/379.8 |
| 6,251,557 B1 | * | 6/2001 | Lapin et al. ................ | 430/269 |
| 6,322,958 B1 | * | 11/2001 | Hayashi ..................... | 430/495 |

FOREIGN PATENT DOCUMENTS

| | | |
|---|---|---|
| EP | 470705 | 2/1992 |
| EP | 0 470 705 | 2/1992 |
| JP | SHO 56-144478 | 11/1981 |
| JP | SHO 60-247515 | 12/1985 |

* cited by examiner

Primary Examiner—Janet Baxter
Assistant Examiner—Sin J. Lee
(74) Attorney, Agent, or Firm—Darby & Darby

(57) ABSTRACT

In stereolithographic apparatus and method, a mask is formed on a light-transmissible member (glass plate) on the basis of stereolithographic data for one layer of photohardenable resin; photohardenable resin of one layer is successively supplied to form an unhardened resin layer of photohardenable resin; if necessary, a film having light transmission is attached onto the unhardened resin layer so as to cover the unhardened resin layer in close contact with the unhardened resin layer; the light-transmissible member having the mask on or above the film; the unhardened resin layer is plane-exposed to light through the mask to harden the photohardenable resin of the unhardened resin layer; and the light-transmissible member and the film are evacuated from the hardened photohardenable resin layer after the exposure by the exposure means, thereby obtaining a desired three-dimensional object through stereolithography. As the photohardenable resin may be used having a melting temperature ranging from 5 to 90° C. when unhardened. In this case, in at least a part of the photohardened layer forming/laminating process, under a state that an unhardened photohardenable resin layer forming the same surface as a photohardened layer which has been already formed is kept solid at a temperature less than the melting temperature, a layer of photohardenable resin is formed on the surface of the solid photohardenable resin layer, and the photohardenable resin layer is exposed to light controlled on the basis of stereolithographic data to laminate a photohardened layer on the solid photohardenable resin composition layer.

57 Claims, 17 Drawing Sheets

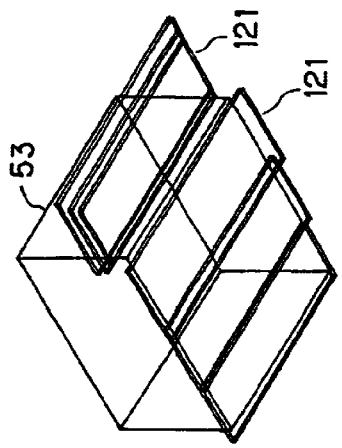
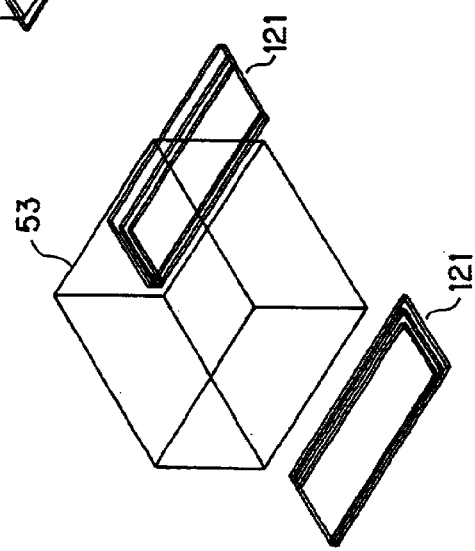
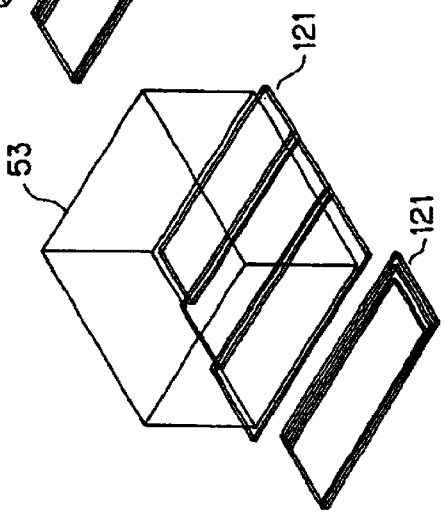

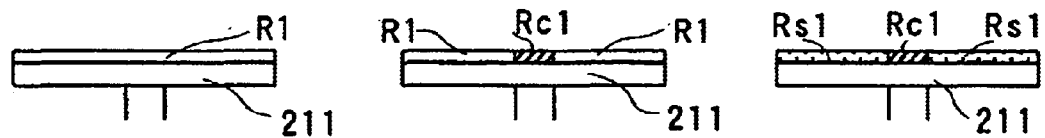
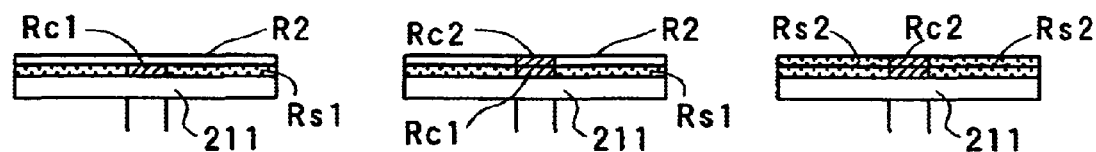
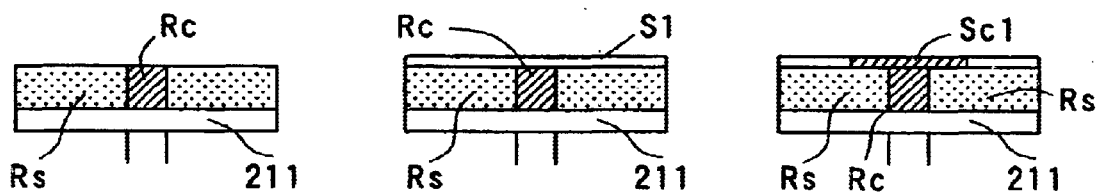
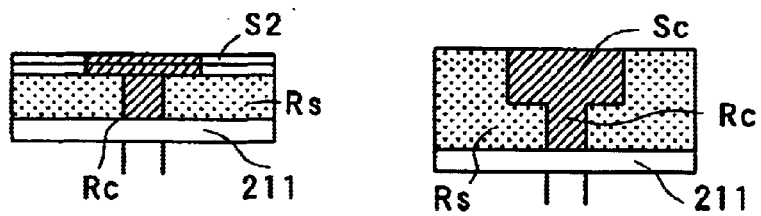
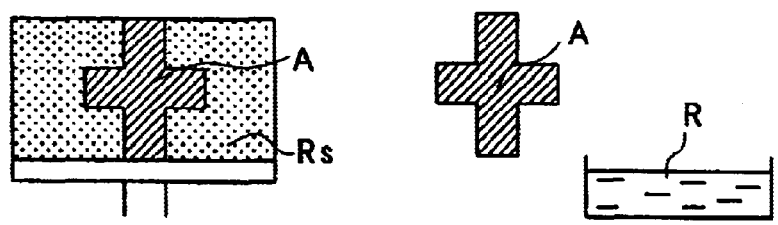

STEREOLITHOGRAPHIC APPARATUS AND METHOD FOR MANUFACTURING THREE-DIMENSIONAL OBJECT WITH PHOTOHARDENABLE RESIN

BACKGROUND OF THE INVENTION

1. Field of the Invention

The present invention relates to stereolithographic apparatus and method for optically manufacturing a three-dimensional object by using photohardenable resin, and particularly the present invention relates to stereolithographic apparatus and method for exposing the overall surface of a photohardenable resin layer to light through a mask at a time to optically manufacture a three-dimensional object, and also to stereolithographic apparatus and method for optically manufacturing a three-dimensional object having a complicated shape such as an overhang portion, portions which are separately mounted, plural leg portions which are different in length, or the like by using specific photohardenable resin composition. In the following description, "stereolithographic process" is defined as a process of exposing photohardenable resin or photohardenable resin composition to light to form a photohardened layer, and repeating the light exposing operation on photohardenable resin (composition) to laminate photohardened layers on a layer basis, thereby optically forming a desired three-dimensional object.

2. Description of the Related Art

In general, liquid photohardenable resin composition (hereinafter referred to as "photohardenable resin") has been widely used as coating (particularly, hard coating), photoresist, dental materials, etc. Recently, much attention has been paid to a so-called stereolithography technique which optically forms a three-dimensional object on the basis of data output from a controller such as a three-dimensional CAD system or the like by using photohardenable resin because a three-dimensional object can be optically formed in desired shape and size with high precision even when it has a complicated structure. With respect to the stereolithography technique, Japanese Laid-open Patent Application No. Sho-56-144478 discloses a stereolithographic method for repeating a process of applying a required amount of optical energy to liquid photohardenable resin under control to harden the photohardenable resin as a thin layer, further supplying liquid photohardenable resin onto the hardened resin layer and then exposing the liquid photohardenable resin to light controlled on the basis of stereolithographic data from a controller to harden the liquid photohardenable resin and laminate the thin hardened photohardenable resin layer on the preceding hardened resin layer, whereby a subsequent hardened photohardenable resin layer is successively laminated on a preceding hardened photohardenable resin layer to manufacture a desired three-dimensional object. Further, a practical use method of the stereolithographic method disclosed in the above publication is proposed in Japanese Laid-open Patent Application No. Sho-60-247515, and then various proposals on the stereolithography technique have been made. As a method of optically manufacturing a three-dimensional object has been generally and widely used a method of selectively irradiating laser beams such as ultraviolet laser beams or the like to the liquid surface of liquid photohardenable resin put in a stereolithographic bath under the control of a computer to harden the photohardenable resin so that a photohardened resin layer having a predetermined thickness and a desired pattern is obtained, then supplying a layer of liquid photohardenable resin onto the photohardened resin layer and then likewise exposing a laser beam such as an ultraviolet laser beam or the like to the liquid photohardenable resin layer to harden the photohardenable resin layer, and repeating the lamination/photohardening operations until a targeted three-dimensional object is obtained.

In general, it takes a long time to irradiate laser beams to a layer of photohardenable resin until the photohardenable resin layer is hardened, and for the purpose of increasing the stereolithographic process speed, an apparatus for forming a mask and irradiating the overall surface of a photohardenable resin layer through the mask pattern by an ultraviolet lamp at a time (hereinafter referred to as "plane-exposure") has been proposed.

According to such a plane-exposing apparatus, a mask having a predetermined pattern formed on the surface thereof is formed and superposed on a unhardened photohardenable resin layer, and then the overall surface of the unhardened photohardenable resin layer is exposed to ultraviolet rays through the mask at a time (i.e, plane-exposed), thereby hardening the photohardenable resin layer in accordance with the mask pattern.

In the plane-exposing apparatus, however, since the mask is not brought into close contact with the unhardened photohardenable resin layer in the exposure process, uneven portions are formed on the surface of the hardened resin layer and thus it is required to cut out these uneven portions layer by layer after the hardening operation of the photohardenable resin is completed.

Furthermore, in a process of forming a photohardenable resin layer, a solid surrounding member is beforehand formed and fixed so as to surround the photohardenable resin layer, and then unhardened photohardenable resin is supplied into the inside of the fixed solid surrounding member. Therefore, unhardened photohardenable resin remains in the solid surrounding member. If the uneven portions on the surface of the hardened resin layer are cut out while the residual unhardened photohardenable resin is left, the corner portions of the hardened resin layer may be defected. In order to avoid this disadvantage, after the photohardenable resin layer is hardened, the unhardened photohardenable resin is scraped up, wax is filled into the scraped portions to prevent defects and then the uneven portions on the surface of the hardened resin layer are cut out. Therefore, extra wax, etc. are required.

Still furthermore, three-dimensional objects having complicated shapes such as overhang portions, separately-mounted portions, plural leg portions which are different in length, uneven portions, etc. have been widely manufactured by using the conventional stereolithography technique. Individual hardened layers which are successively formed by light irradiation are extremely thin, and thus a laminate obtained by laminating these thin layers is also thin. Therefore, the laminate thus finally obtained has a lower shape holding performance. In addition, photohardenable resin in a stereolithographic bath is liquid, and it has little capability of supporting a photohardened layer. Therefore, when a three-dimensional object having a complicated shape such as overhand portions, separately mounted portions, leg portions which are different in length, uneven portions or the like is manufactured, there is liable to occur such problems as hang-down, deformation, dimensional deviation, positional shift, etc. of stereolithographically-formed sites formed by photohardening during the stereolithographic process. Accordingly, in order to avoid these problems, there has been generally adopted a method of disposing a separately-formed support in a stereolithographic bath and stereolithographically forming a desired three-dimensional object while the object being formed is supported by the support (hereinafter referred to as "support basing method"), or a method of stereolithographically forming a desired three-dimensional object while an extra support portion is simultaneously formed together with the desired three-dimensional object (hereinafter referred to as "support attaching method").

In the following description, the support-based supporting method and the support-attached supporting method will be described; in detail with reference to FIGS. 1 to 4F particularly when these methods are applied to the stereolithographic process of forming three-dimensional objects having specific structures.

In the case of a three-dimensional object having a disc portion 202 between upper and lower cylindrical portions 201a, 201b as shown in FIG. 1, when the stereolithographic operation is carried out on a layer basis from the lower end of the cylindrical portion 201a, overhand portions are formed at the disc portion 202 because the diameter of the disc portion 202 is larger than that of the lower cylindrical portion 201a.

In this case, if the stereolithographic operation is carried out on the overhand portions without using any support, there would occur such a problem that the disc portion 202 is formed so as to hang down or obliquely extend during the stereolithographic operation, and thus it is difficult to design the disc portion in a horizontal disc structure. Therefore, it is difficult to manufacture a three-dimensional object having desired shape and dimension.

In order to solve this problem, a separate support 203 as shown in FIGS. 2A and 2B is disposed in a stereolithographic bath and the stereolithographic operation is carried out while the overhand portions are supported by the support 203 (the support basing method). Here, FIG. 2A is a longitudinal sectional view of a desired three-dimensional object supported by a support when the stereolithographic operation is carried out, and FIG. 2B is a plan view taken from the lower side of the stereolithographically formed object.

Alternatively, in order to solve the above problem, the stereolithographic operation is carried out while a support portion 204 as shown in FIGS. 3A, 3B is formed integrally with the desired three-dimensional object to prevent the overhand portions from hanging down or being deformed (the support attaching method). Here, FIG. 3A is a longitudinal sectional view showing a desired three-dimensional object and a support which is integrally formed with the object, and FIG. 3B is a plan view taken from the lower side of the stereolithographically formed object.

Further, in the case of a three-dimensional object having a central joint plate portion 205, right and left leg portions 206 and 207 which are different in length and extend downwardly from the central joint plate portion 205, and right and left arm portions 208 and 209 extending upwardly from the central joint plate portion 205 as shown in FIG. 4A, the stereolithographic operation is started from the lower end of the longer leg portion 206 in a stereolithographic bath 212 in which liquid photohardenable resin is put as shown in FIG. 4B, and at the time when the height of the leg portion 206 reaches the position corresponding to the lower end of the shorter leg portion 207 as shown in FIG. 4C, the stereolithographic operation is carried out on both the right and left leg portions 206 and 207 at the same time. In this case, a thin-layer portion (photohardened resin layer) 207a constituting the shorter leg portion 207 is not joined to a thin-layer portion (photohardened resin layer) 206a constituting the longer leg portion 206. In addition, the thin-layer portion 207a is not mounted on a mount table, but floated on the liquid photohardenable resin, so that it is liable to be moved. Therefore, the distance between the thin-layer portions 206a and 207a cannot be kept to the proper value in design.

Therefore, in order to avoid this disadvantage, the conventional stereolithographic technique has generally used a method in which as shown in FIG. 4D (longitudinal sectional view) and FIG. 4E (plan view taken from the upper side), a support portion 210 for joining the thin-layer portion 207a to the thin-layer portion 206a is formed simultaneously with the start of the stereolithographic formation of the thin-layer portion 207a of the shorter leg portion 207 (i.e., the support attaching operation is carried out), thereby manufacturing a three-dimensional object having the support portion 210 as shown in FIG. 4F.

In the case of the support basing method, there is required a cumbersome work for forming a support in advance and disposing it in a stereolithographic bath. In addition, it is required that the shape and dimension of a support which is suitable to smoothly prevent hang-down and deformation at an overhang portion are designed in advance and the support is disposed at a proper position, so that great skill is required for the design and use of the support. Further, a support contact mark is liable to remain at a portion on the surface of the three-dimensional object thus formed at which the object was supported by the support. Therefore, the three-dimensional object thus formed has a defective appearance, and a repair treatment of polishing and smoothening the defective portion is required if occasion demands.

In the case of the support attaching method, there is required a cumbersome work for cutting the support portion integrally formed with the three-dimensional object after the stereolithographic operation is completed, thereby removing the undesired support portion. In addition, in order to prevent the appearance of the three-dimensional object from being defective due to the cutting of the support portion, it is necessary to take the shape, size and mount position of the support portion into sufficient consideration, so that sufficiently great skill is required for the support attaching method. Further, when the support portion is removed, it is necessary to remove the support portion while the portion serving as the support portion in the three-dimensional object is sufficiently discretely discriminated from the other portions constituting the desired three-dimensional object (target object). Therefore, if a worker is not skilled to the extent that he/she can understand CAD data, drawings of parts, etc., it is more difficult to perform the removing work of the support portion.

In order to solve the above problems of the conventional stereolithography technique, Japanese Laid-open Patent Application No. Sho-63-72525 discloses a method in which solidifying material such as wax or the like is used as a second material together with a first material of liquid photohardenable resin and a three-dimensional object is optically (stereolithographically) formed while hang-down and deformation at overhand portions, etc. are prevented by the solidifying material.

According to this method, the solidifying second material functions as a support material for supporting a thin layer of photohardened photohardenable resin to prevent the hang-down, the deformation, etc. at the overhang portions, etc. However, in the stereolithographic method disclosed in the above publication, the second material for supporting the shape of an object being stereolithographically formed is separately required together with photohardenable resin with which a desired three-dimensional object is formed. In addition, use of the second material adds the normal process with a step of sucking unhardened photohardenable resin after the light irradiation step is carried out. Further, it further adds many other steps such as a step of coating the solidifying second material in empty portions occurring due to the suction of the unhardened photohardenable resin, a step of polishing and flattening the upper surface of the solidified second material to enhance the dimensional precision in height direction, etc. As a result, the stereolithographic work is extremely complicated, and much labor and time are required to complete the stereolithographic process, so that the stereolithographic apparatus is complicated in construction, scaled up in size and increased in price.

Furthermore, if the second material such as wax or the like coated on the photohardened layer is not sufficiently removed in the flattening and polishing step and thus remains on the photohardened layer, the second material such as wax or the like would be interposed between the photohardened layer and a next photohardenable layer laminated thereon, so that the adhesion between the photohardenable layers is disturbed, the laminated photohardenable layers are liable to be peeled off each other and the strength of the three-dimensional object thus formed is lowered.

Still furthermore, photohardenable resin used in the stereolithography technique is generally expensive, and thus unhardened photohardenable resin which has not been photohardened (subjected to the photohardening treatment) has been generally withdrawn and reused after the three-dimensional object is manufactured. However, in the above stereolithographic method disclosed in the above publication, a lot of the second material such as wax or the like is contaminated in unhardened photohardenable resin, and thus it is required to reuse the unhardened photohardenable resin for the stereolithographic process after the second material is perfectly removed from the unhardened photohardenable resin. Therefore, much labor and much cost are needed to purify, withdraw and reuse the photohardenable resin.

SUMMARY OF THE INVENTION

Therefore, an object of the present invention is to provide stereolithographic apparatus and method which can solve the above problems of the conventional technique, and can perform plane-exposure with a simple construction.

Another object of the present invention is to provide stereolithographic apparatus and method which can easily form a photohardened resin layer having no uneven surface (i.e., flat surface) in a stereolithographic process.

Other object of the present invention is to provide stereolithographic apparatus and method in which even when a three-dimensional object having a complicated shape such as overhang portions, separately-mounted portions, plural leg portions different in length, uneven portions or the like is manufactured, a desired three-dimensional object can be simply and smoothly manufactured without separately disposing any support in a stereolithographic bath and without forming any support portion serving as a support integrally with a three-dimensional object itself (i.e., without support-attaching).

Further, other object of the present invention is to provide stereolithographic apparatus and method which can optically form a three-dimensional object having a complicated shape such as overhang portions, separately-mounted portions, plural leg portions different in length, uneven portions or the like smoothly and in a short time without any second material such as wax and with only photohardenable resin by a simple process and a simple apparatus.

In order to attain the above objects, according to a first aspect of the present invention, there is provided a stereolithographic apparatus for irradiating light to an unhardened photohardenable resin layer on the basis of data on stereolithography to optically form a desired three-dimensional object, which is characterized by comprising: means for forming a mask on a light-transmissible member on the basis of stereolithographic data for one layer of photohardenable resin; means for forming an unhardened resin layer of photohardenable resin; means for disposing the light-transmissible member having the mask on the unhardened resin layer while the light-transmissible member is brought into close contact with the unhardened resin layer, or disposing the light-transmissible member having the mask above the unhardened resin layer; exposing means for exposing the unhardened resin layer to light through the mask to harden the photohardenable resin of the unhardened resin layer; and evacuating means for evacuating the light-transmissible member from the hardened photohardenable resin layer after the photohardenable resin of the unhardened resin layer is exposed to light, the desired three-dimensional object being formed by repeating the stereolithography using the respective means.

According to the first aspect of the present invention, since the mask is brought into close contact with the unhardened photohardenable resin layer in the plane-exposing operation, the surface of the hardened resin layer can be flattened. Accordingly, no treatment on the surface of the hardened resin layer after the exposing operation is required, and thus the stereolithographic process can be easily performed.

According to a second aspect of the present invention, there is provided a stereolithographic apparatus for irradiating light to an unhardened photohardenable resin layer on the basis of data on stereolithography to optically form a desired three-dimensional object, which is characterized by comprising: means for forming a mask on a light-transmissible member on the basis of stereolithographic data for one layer of photohardenable resin; photohardenable resin supply/forming means for successively supplying photohardenable resin of one layer to form an unhardened resin layer of photohardenable resin; a film having light transmission which is attached onto the unhardened resin layer so as to cover the unhardened resin layer in close contact with the unhardened resin layer; means for disposing the light-transmissible member having the mask on the film while the light-transmissible member is brought into close contact with the film, or disposing the light-transmissible member having the mask above the film; exposure means for exposing the unhardened resin layer to light through the mask to harden the photohardenable resin of the unhardened resin layer; and evacuating means for evacuating the light-transmissible member and the film from the hardened photohardenable resin layer after the exposure by the exposure means, the desired three-dimensional object being formed by repeating the stereolithography using the respective means.

According to the second aspect of the present invention, the film is attached onto the unhardened photohardenable resin layer with being stretched in the plane-exposure operation, whereby the unhardened photohardenable resin layer is held and no photohardenable resin flows out through the gap between the unhardened photohardenable resin layer and the film. Further, since the film is brought into close contact with the unhardened photohardenable resin layer during the plane-exposing operation, the surface of the resin layer after photohardened is flattened, so that no treatment on the surface of the resin layer after photohardened is required and thus the stereolithographic operation can be easily performed.

According to a third aspect of the present invention, there is provided a stereolithographic apparatus for irradiating light to an unhardened photohardenable resin layer on the basis of stereolithographic data to harden the photohardenable resin layer and repeating the light-irradiating operation for subsequent unhardened photohardenable resin layers in turn to optically form a desired three-dimensional object, which is characterized by comprising: means for forming a mask on a light-transmissible member on the basis of stereolithographic data for one layer of photohardenable resin; a stereolithographic table for mounting photohardenable resin thereon; coating means for successively coating photohardenable resin on the table to form each unhardened photohardenable resin layer; film attaching means for attaching a film having light transmission onto the unhardened photohardenable resin layer; means for superposing the light-transmissible member having the mask on the film or disposing the light-transmissible member having the mask above the film; exposure means for exposing the photohardenable resin of the unhardened photohardenable resin layer through the mask; and film peeling means for peeling off the film after the unhardened photohardenable resin layer is exposed, the desired three-dimensional object being formed by repeating the stereolithography using the respective means.

Further, according to a fourth aspect of the present invention, there is provided a stereolithographic method for irradiating light to an unhardened photohardenable resin layer on the basis of stereolithographic data to harden the photohardenable resin layer and repeating the light-irradiating operation on subsequent unhardened photohardenable resin layers in turn to optically form a desired three-dimensional object, which his characterized by comprising: a step of forming a mask on a light-transmissible member on the basis of stereolithographic data of one layer of photohardenable resin; a step of forming one unhardened photohardenable resin layer; a step of disposing the light-transmissible member having the mask on the unhardened photohardenable resin layer while the light-transmissible member is brought into close contact with the unhardened photohardenable resin layer, or disposing the light-transmissible member having the mask above the unhardened photohardenable resin layer; a step of exposing the unhardened photohardenable resin layer to light through the mask; and a step of evacuating the light-transmissible member after the unhardened photohardenable resin layer is exposed to light, a series of the steps being repeated in this order to form a desired three-dimensional object.

Still further, according to a fifth aspect of the present invention, there is provided a stereolithographic method for irradiating light to an unhardened photohardenable resin layer on the basis of stereolithographic data to harden the photohardenable resin layer and repeating the light-irradiating operation on subsequent unhardened photohardenable resin layers in turn to optically form a desired three-dimensional object, which is characterized by comprising: a step of forming a mask on a light-transmissible member on the basis of stereolithographic data of one layer of photohardenable resin; a step of forming an unhardened photohardenable resin layer on a stereolithographic table; a step of attaching onto the unhardened photohardenable resin layer a film having light transmission which holds the unhardened photohardenable resin layer; a step of disposing the light-transmissible member having the mask on the film while the light-transmissible member is brought into close contact with the film, or disposing the light-transmissible member having the mask above the film; a step of exposing the unhardened photohardenable resin layer to light through the mask; and a step of evacuating the light-transmissible member and the film after the unhardened photohardenable resin layer is exposed to light, a series of the steps being repeated in this order to form a desired three-dimensional object.

In order to attain the above objects, the inventors of this application have made further various experiments and reviews repetitively, and as a result they have found out that a three-dimensional object having complicated shape and structure with overhang portions, separately-mounted portions, plural leg portions different in length, uneven portions or the like can be simply and smoothly manufactured with high precision without occurrence of hang-down, deformation and displacement at the above portions neither by disposing a separate support in a stereolithographic bath nor by attaching a support to a three-dimensional object itself, and further without any second material such as wax or the like as support material under the condition that a photohardenable resin composition which has a melting temperature ranging from 5 to 90° C. before it is photohardened and is reversibly shifted from liquid-phase to solid-phase or from solid-phase to liquid-phase with the melting temperature at the boundary between these phases is used as photohardenable resin. When a photohardenable resin is exposed to light to form a photohardened layer, the above photohardenable resin composition constituting the same surface as a photohardened layer which has been already formed and is just below a photohardened layer to be next formed is kept at a temperature less than the melting temperature thereof to keep the photohardenable resin composition solid, and then a layer of photohardenable resin composition is supplied onto the solid surfaces of the solid photohardenable resin composition layer and the photohardened layer and exposed to light while the layer thus supplied is supported by the solid surfaces of the solid photohardenable resin composition layer and the photohardened layer to further form a photohardened layer.

Further, the inventors of this application has also found out that in the stereolithographic operation, a photohardenable resin layer to be supplied onto the surface of a solid photohardenable resin composition layer may be supplied in any one of liquid and solid states, and the photohardenable resin layer thus supplied may be photohardened in any one of liquid and solid states.

Still further, the inventors of this application has also found out that when the stereolithographic operation is carried by the above method using the photohardenable resin composition having the melting temperature ranging from 5 to 90° C. before it is photohardened, if the photohardenable resin composition is heated to be kept at a temperature above the melting temperature thereof after the stereolithographic operation is completed or at some midpoint of the stereolithographic operation, the photohardenable resin composition which is not subjected to photohardening (i.e. unhardened resin composition) becomes liquid, so that it can be easily and smoothly separated from a three-dimensionally object formed by the photohardening, and also the unhardened photohardenable resin composition thus separated can be directly reused for the subsequent (next) stereolithographic operation because it does not contain any second material such as wax or the like.

Still further, the inventors of this application has also found out that the unhardened photohardenable resin composition can be separated from the three-dimensional object formed by the photohardening not only by using the above heat-melting method of heating and melting the solid unhardened photohardenable resin composition, but also by using a method of dissolving the solid unhardened photohardenable resin composition with solvent.

Accordingly, according to a sixth aspect of the present invention, there is provided a stereolithographic method including a photohardened layer forming step of exposing a photohardenable resin composition layer to light controlled on the basis of stereolithographic data to harden the photohardenable resin composition layer, thereby forming a photohardened layer having predetermined pattern and thickness, and a photohardened layer forming/laminating step for forming a photohardenable resin composition layer on the photohardened layer formed in said photohardened layer forming step, exposing the photohardenable resin composition layer to light controlled on the basis of stereolithographic data to laminate a subsequent photohardened layer on the preceding photohardened layer, and repeating the lamination of a subsequent photohardened layer on a preceding photohardened layer until a desired three-dimensional object is obtained, which is characterized in that the photohardenable resin composition has a melting temperature ranging from 5 to 90° C. when unhardened, and in at least a part of the photohardened layer forming/laminating process, under a state that an unhardened photohardenable resin layer forming the same surface as a photohardened layer which has been already formed is kept solid at a temperature less than the melting temperature, a layer of photohardenable resin composition is formed on the surface of the solid photohardenable resin composition layer, and the photohardenable resin composition layer is exposed to light controlled on the basis of stereolithographic data to laminate a photohardened layer on the solid photohardenable resin composition layer.

Further, according to a seventh aspect of the present invention, there is provided a stereolithographic apparatus comprising: supply means of successively supplying a layer of photohardenable resin composition onto a mount table or a photohardened layer formed by hardening photohardenable resin composition; stereolithography means having a light irradiation device for repeating formation/lamination of photohardened layers each having predetermined pattern and thickness under control until a desired three-dimensional object is formed; and temperature adjusting means for keeping the temperature of the photohardenable resin (composition): to a temperature less than the melting temperature thereof.

BRIEF DESCRIPTION OF THE DRAWINGS

FIGS. 18A to 18C are perspective views showing another embodiment of the shutter;

FIGS. 19A to 19M are diagrams showing a series of steps to form the three-dimensional object of FIG. 1 by using the stereolithographic method of the present invention.

DETAILED DESCRIPTION OF THE PREFERRED EMBODIMENTS

Preferred embodiments of the stereolithographic apparatus and method according to the present invention will be described hereunder with reference to the accompanying drawings.

Figure 5:
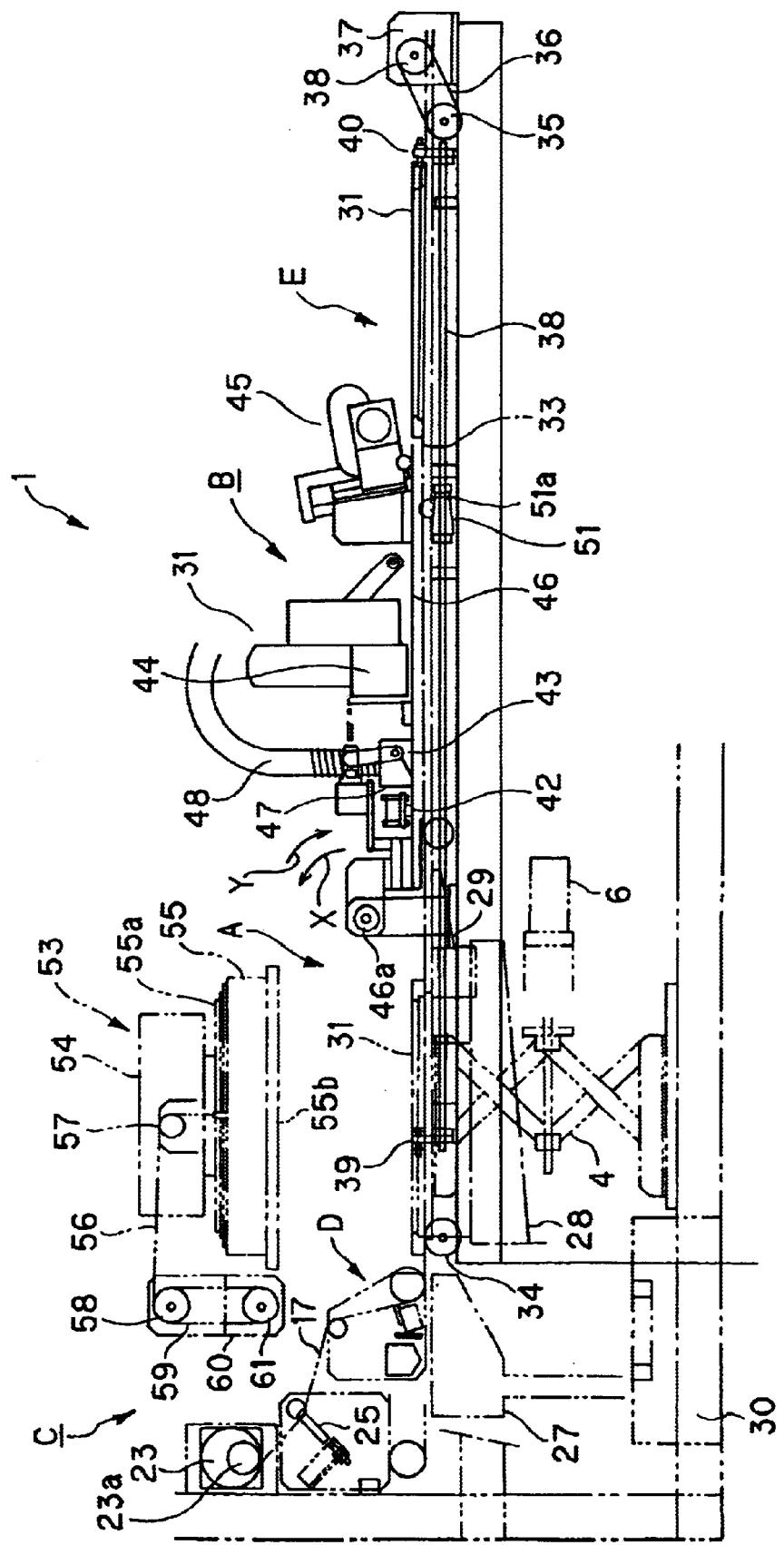
FIG. 5 is a front view showing an embodiment of an stereolithographic apparatus according to the present invention.

FIG. 5 is a front view showing an embodiment of the stereolithographic apparatus of the present invention. In FIG. 5, reference numeral 1 represents a stereolithographic apparatus. The stereolithographic apparatus includes a stereolithographic stage A disposed substantially at the center of the overall apparatus, a mask forming stage B disposed at one side of the stereolithographic stage A, and a photohardenable resin (photohardenable resin composition) supply stage C disposed at the other side of the stereolithographic stage A.

The stereolithographic apparatus has a controller (not shown) for three-dimensional CAD or the like. In the mask forming stage B, a mask is formed on a light-transmissible member formed of glass or the like in accordance with stereolithographic data for a layer of photohardenable resin (photohardenable resin composition) on the basis of which each photohardened resin layer is successively formed/laminated. The supply stage C includes an unit D for supplying photohardenable resin, and the unit D is moved into the stereolithographic stage A to coat a layer of photohardenable resin onto a three-dimensional object under construction which is located in the stereolithographic stage A, thereby forming an unhardened photohardenable resin layer. Further, the light-transmissible member (glass) having the mask formed thereon is fed from the mask forming stage B into the stereolithographic stage A, and disposed on the unhardened photohardenable resin layer so as to come into close contact with the unhardened photohardenable resin layer. Thereafter, the overall surface of the unhardened photohardenable resin layer is exposed to light through the mask at a time (that is, the plane-exposure is carried out) to perform the stereolithographic operation.

Figure 6:
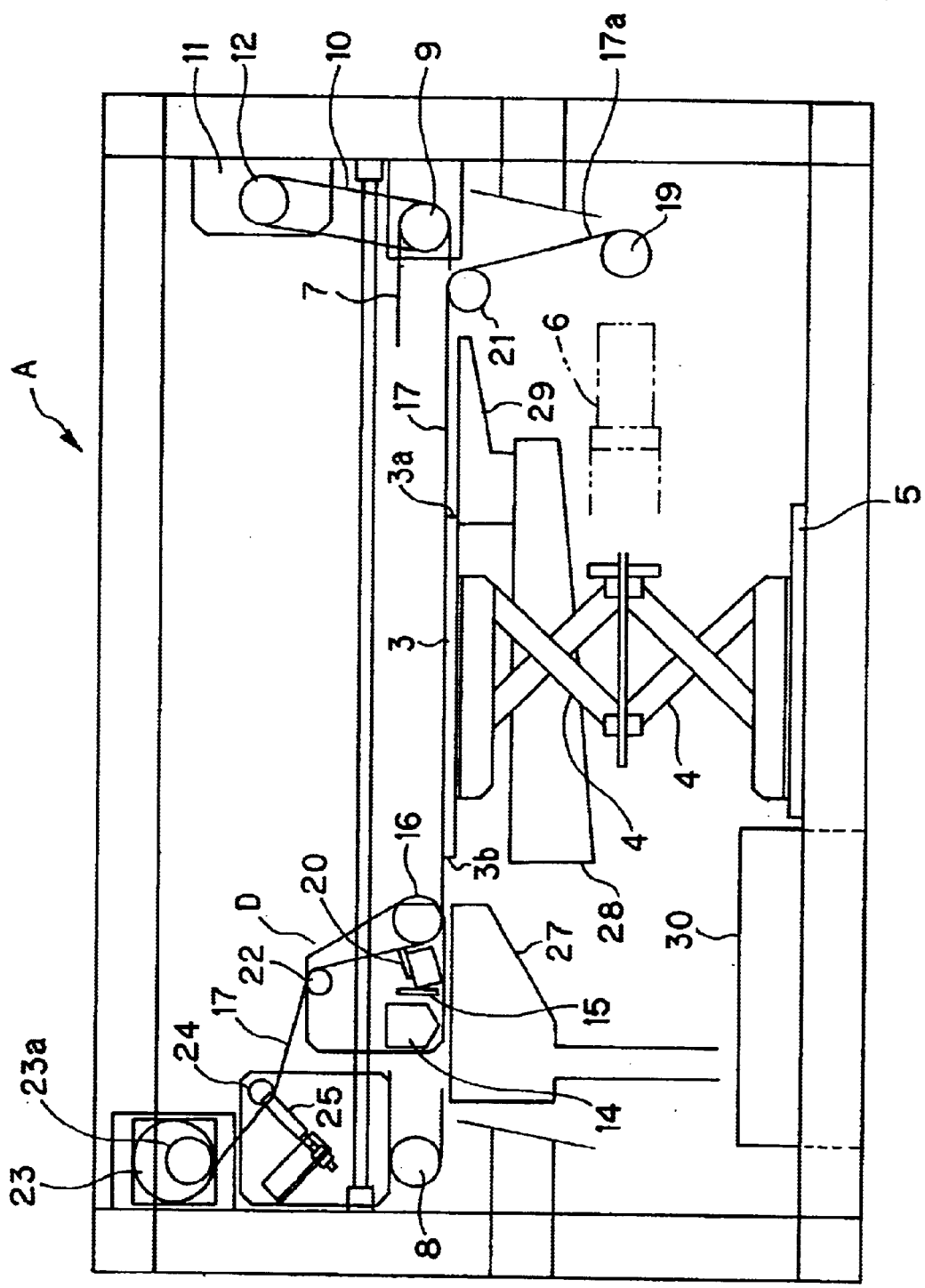
FIG. 6 is a front view showing a stereolithographic stage used in the stereolithographic apparatus of FIG. 5.

As shown in FIG. 6, the stereolithographic stage A has a stereolithographic table (hereinafter referred to as "mount table") 3. The mount table 3 has two substantially-X-shaped expanding and contracting links 4 which are stacked on a base 5, and the output shaft of a servo motor 6 is connected to the expanding and contracting links 4. In synchronism with the driving of the servo motor 9, the expanding and contracting links are contracted so that the mount table 3 is controlled to freely descend layer by layer. A stainless plate is attached to the top surface of the mount table 3, and the first unhardened photohardenable resin layer described later is directly coated on the top surface of the mount table 3.

A desired three-dimensional object is optically formed on the stereolithographic table 3 through the stereolithographic operation. In the stereolithographic operation, the unit D located in the supply stage C is first driven to form a layer of unhardened photohardenable resin layer on the mount table 3 (or a three-dimensional object being formed).

The unit D is linked to a timing belt 7, and the timing belt 7 runs between a pair of sprockets 8 and 9. Another timing belt 10 is put on the sprocket 9, and it runs between the sprocket 9 and a sprocket 12 of a driving motor 11. Accordingly, by forwardly/reversely rotating the driving motor 11, the unit D is fed to the right/left side along the timing belt 7.

The unit D includes a resin supply dipper 14 for supplying (coating) photohardenable resin when a photohardenable resin layer is formed, a coating blade 15 for flattening the surface (liquid surface) of the photohardenable resin layer thus supplied (coated), and a peeling/attaching roller 16 for peeling a light-transmissible film 17 (formed of synthetic resin such as polyester or the like) off a photohardenable resin layer or attaching the light-transmissible film 17 onto the photohardenable resin layer. In the following description, the "attaching" of the film to the resin layer means such a state that the film is disposed with being stretched so as to cover the resin layer in close contact with the resin layer.

The polyester film 17 is disposed over the mount table 3 so as to be stretched in the direction from one end 3a of the table to the other end 3b. A roller 19 having a torque limiter is disposed at the outside of the one end 3a of the mount table 3, and one end 17a of the film 17 is wound around the roller 19. The other end 17b of the film 17 is passes through a roller 21, the peeling/attaching roller 16 and a roller 22, and then wound around a roller 234a of a film re-covering roller 23. Reference numeral 24 represents a tension roller. The tension roller is linked to a rod of an air cylinder 25 to be urged so that tension is applied to the film 17.

Next, the operation of the unit D will be described.

Figure 2A:
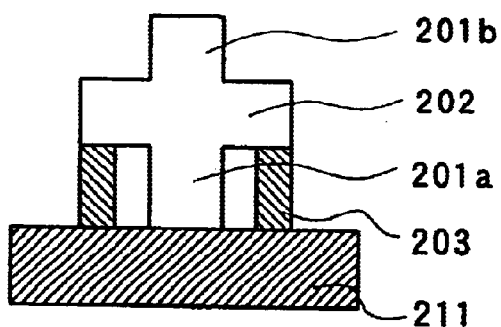
FIGS. 2A and 2B are longitudinal sectional view and plane view showing a three-dimensional object (of FIG. 1) with a support when it is manufactured by a conventional stereolithographic method (support basing method)
Figure 2B:
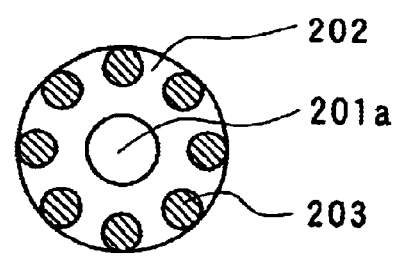
Figure 3A:
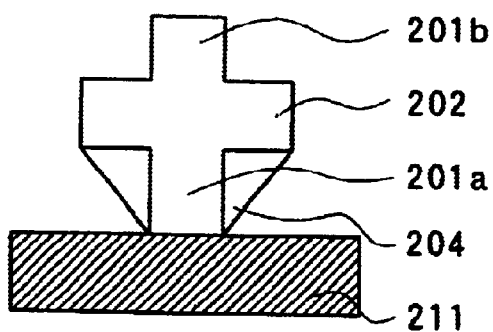
FIGS. 3A and 3B are longitudinal sectional view and plane view showing a three-dimensional object (of FIG. 1) with a support when it is manufactured by a conventional stereolithographic method (support attaching method)
Figure 3B:
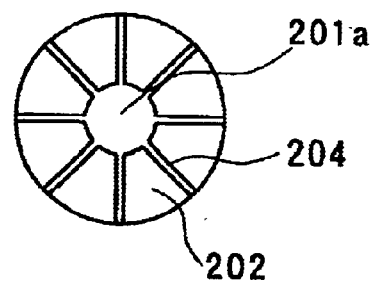
Figure 7:
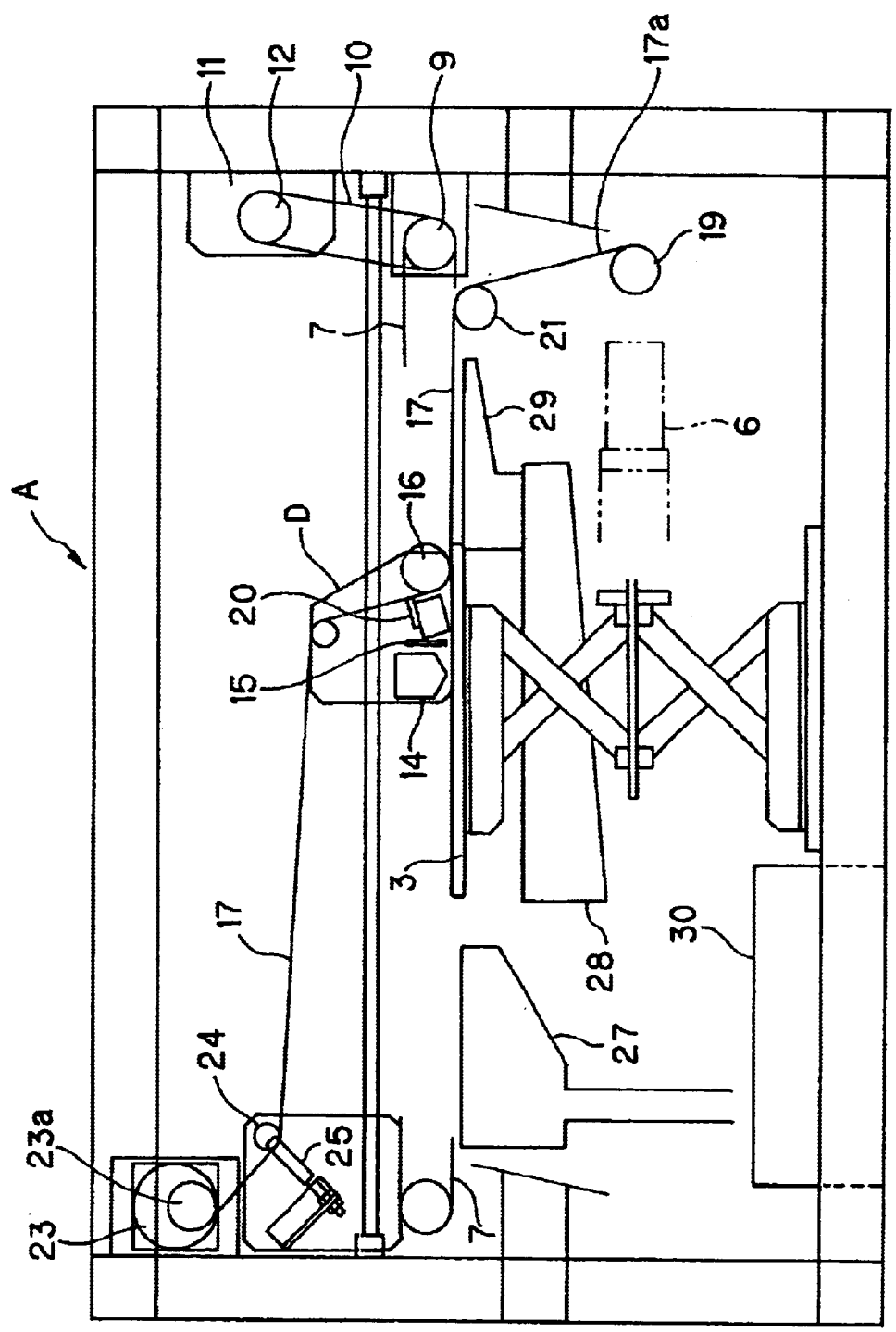
FIG. 7 is a front view showing the movement of a unit used in the stereolithographic apparatus of FIG. 5.

When the driving motor 11 at the upper right side of FIG. 2 is forwardly rotated, the unit D is fed toward the position shown in FIG. 6 to the position shown in FIG. 7 along the timing belt 7.

During this feeding process, a film 17 is first peeled off a hardened resin layer while pressed by the peeling/attaching roller 16. Since the film 17 is peeled while pressed by the peeling/attaching roller 16 as described above, the resin layer attached to the film 17 is prevented from being peeled off the mount table 3 together with the film 17. When the film 17 is peeled off, a bit of photohardenable resin may have adhered to the film 17. In this case, the photohardenable resin is removed by a blade 20 provided to the unit D.

At the same time when the film 17 is peeled off, photohardenable resin is newly supplied from the resin supply dipper 14 onto an object being formed to form a new unhardened photohardenable resin layer.

When the unit D is fed by the timing belt 7 and reaches the right end in FIG. 6, the mount table 3 is downwardly moved by the height corresponding to one layer of the photohardenable resin. Subsequently, the driving motor 11 is reversely rotated, and the unit D is returned from the position of FIG. 7 to the position of FIG. 6 along the timing belt 7. During this reverse feeding process, the coating blade 15 first removes surplus resin to flatten the liquid surface of the resin so that the height of the resin is uniform, and then the film is attached onto the resin layer thus flattened while pressed by the peeling/attaching roller 16. With this film attaching operation, the height of the liquid surface of the resin is kept to a predetermined value, and after the film 17 is attached, the resin is held at that position.

In short, the film 17 is disposed so as to cover the resin layer with being stretched (i e., attached to the resin layer) in order to hold the resin layer. Accordingly, various members may be used as the film 17 insofar as it has the above function, and for example, a sheet having light transmission performance may be used.

During the above operation, the film 17 may be damaged. For example, if the thickness of an unhardened photohardenable resin layer on the mount table 3 is small, the film 17 may be damaged due to the contact with a corner portion of the mount table 3. Therefore, when the film 17 is damaged, the recover motor 23 located at the left end of FIG. 6 is driven to extend out the film 17 wound around the roller 19 with the torque limiter, thereby changing the use area of the film 17.

There is a possibility that photohardenable resin supplied from the resin supply dipper 14 may drop in the feeding region of the unit D. In order to withdraw the photohardenable resin thus dropping, tanks 27, 28 and 29 are disposed over the substantially whole area below the feeding region of the unit D. The photohardenable resin dropping in the tanks 27, 28 and 29 is withdrawn to a return tank 30. The photohardenable resin is stocked in the return tank 30, and if occasion demands, the resin is supplied through a supply system (not shown) to the resin supply dipper 14.

The mask forming stage B has mask forming means 41 as shown in FIG. 5, and forms a mask on a light-transmissible member (glass) 31 with toner by using the mask forming means 41. The mask forming means 41 includes a demagnetizing head 42 for demagnetizing the surface of the light-transmissible member 31, a toner scraper 43 for scraping toner off the light-transmissible member 31, a charging head 44 for charging the surface of the light-transmissible member 31 and a developer 45 for developing a latent image formed on the light-transmissible member 31 with toner. The charging head 44 is controlled in accordance with the stereolithographic data corresponding to each photohardenable resin layer output from the controller (not shown).

The mask forming means 41 is mounted on a support table 46, and the support table 46 is hinge-linked to the fixing portion of the apparatus by a pin 46a. The mask forming means 41 is freely moved upwardly and downwardly together with the support table 46 with the pin 46a serving as a fulcrum. The toner scraper 43 is covered by a cover 47, and a toner suction hose 48 for sucking toner is connected to the cover 47.

Here, silicon oxide, aluminum oxide, titanium oxide or the like is preferably mixed with toner as UV absorption material. The UV absorbance is set to 10% or more, preferably to 30% or more, and more preferably to 50% or more.

A light-transmissible member standby stage E is provided at one side of the mask forming stage B. The light-transmissible member (glass) 31 is reciprocatively passed through the light-transmissible member standby stage E, the mask forming stage B and the stereolithographic table A in this order.

That is, a pair of belts 33 which are rotationally driven are disposed so as to extend from the light-transmissible member standby stage E through the mask forming stage B to the stereolithographic table A in an arrangement of two lines. The belts 33 are suspended between pulleys 34, 35, and a pulley 38 of a driving motor 37 is linked to one pulley 35 through a belt 36.

The belts 33 are hooked by projections (not shown) on the lower surface of the light-transmissible member 31. Therefore, by rotating the driving motor 37 forwardly/reversely, the belts 33 are moved forwardly/reversely, whereby the light-transmissible member 31 is reciprocatively moved among the respective stages.

An operating bar 38 is disposed over the respective stages E, B and A. Stoppers 39 and 40 are fixed to both the end portions of the operating bar 38. When the light-transmissible member 31 enters the light-transmissible member standby stage E and abuts against the stopper 40, the operating bar 38 is pushed down by the light-transmissible member 31 and moved to the right in FIG. 5.

Accordingly, a cam member 51 fixed to some midpoint of the operating bar 38 is moved to the right integrally with the operating bar 38 in FIG. 5, and the mask forming means 41 leaps up in the direction of an arrow X together with the support table 46 with the pin 46a serving as a fulcrum by the slant cam face 51a of the cam member 51.

On the other hand, when the light-transmissible member 31 enters the stereolithographic stage A and abuts against the stopper 39, the operating bar 39 is pushed by the light-transmissible member 31 and moved to the left in FIG. 5. In this case, the cam member 51 fixed to some midpoint of the operating bar 38 is moved to the left integrally with the operating bar 38 in FIG. 5, and the mask forming means 41 is downwardly moved to the mask forming position together with the support table 46 along the slant cam face. 51a of the cam member 51 in the direction of an arrow Y with the pin 46a serving as a fulcrum.

Next, the operation of forming a mask on the light-transmissible member 31 will be described.

The mask is formed during the process of feeding the light-transmissible member from the stereolithographic stage A side to the light-transmissible member standby stage E side. In this case, the mask forming means 41 is descended to the mask forming position as described above.

When the light-transmissible member 31 enters the mask forming stage B, the surface of the light-transmissible member (glass) 31 is demagnetized by the demagnetizing head 42, and toner attached to the light-transmissible member 31 in the previous stereolithographic operation is removed by the toner scraper 43. Subsequently, the charging head 44 is controlled on the basis of stereolithographic data for a photohardenable resin layer (output from the controller (not shown)) to charge the surface of the light-transmissible member 31 on the basis of the stereolithographic data of one layer and form a latent image on the light-transmissible member 31. Thereafter, the latent image is developed with toner in the developer 45 to form the mask on the surface of the light-transmissible member, and then the light-transmissible member having the mask formed thereon is fed to the light-transmissible member standby stage E.

When the light-transmissible member 31 is fed to the light-transmissible member standby stage E, the mask forming means 41 is made to leap up as described above, and thus a space occurs below the leap-up mask forming means 41. The light-transmissible member 31 having the mask is passed through the space when it is fed from the light-transmissible member standby stage E to the stereolithographic stage A. When the light-transmissible member 31 is fed to the stereolithographic stage A and abuts against the stopper 39, the mask forming means 41 is downwardly moved to the mask forming position as described above and kept on standby there.

As described above, the light-transmissible member 31 fed to the stereolithographic stage A is disposed on the film 17 holding the unhardened photohardenable resin layer while brought into dose.contact with the film 17.

Figure 8:
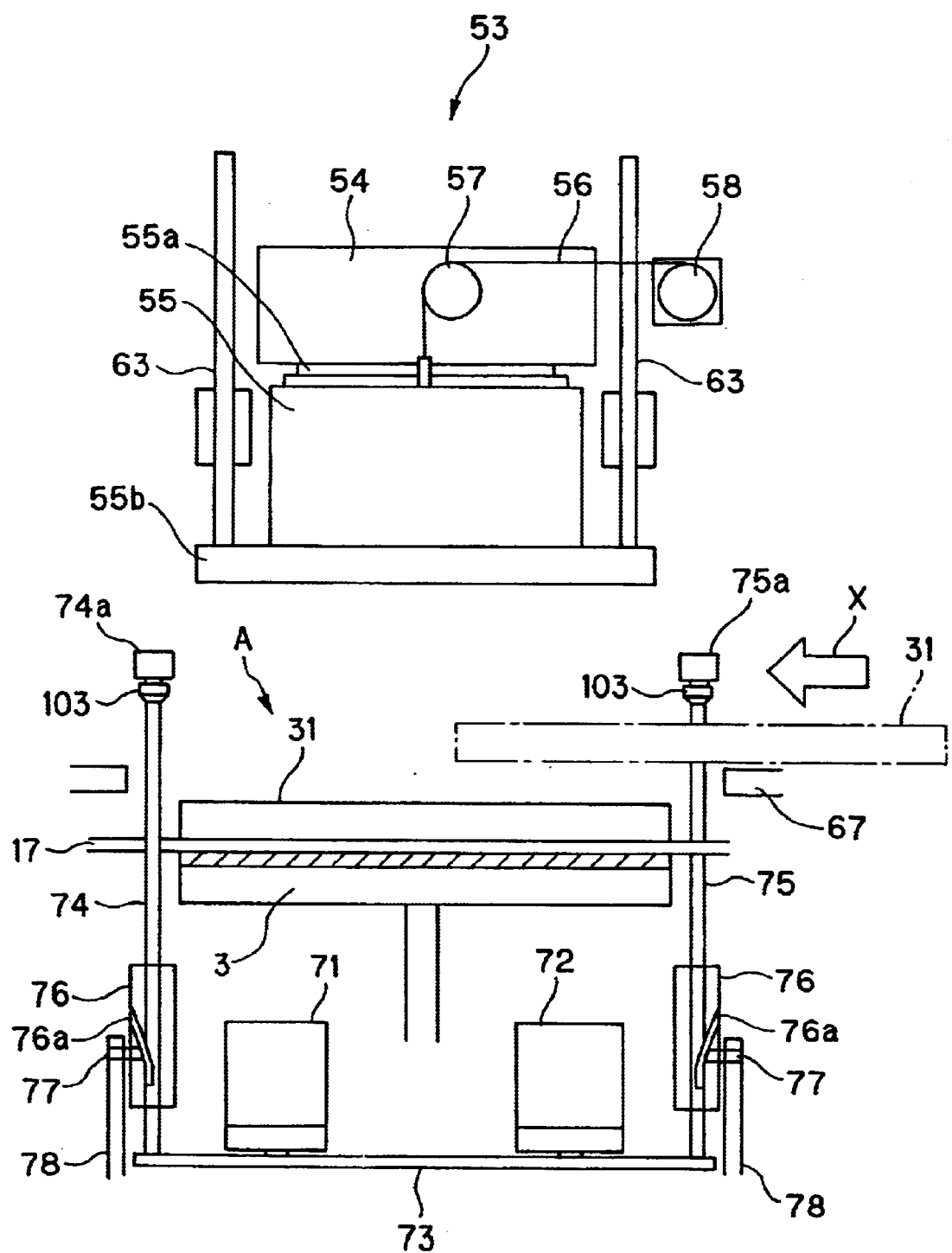
FIG. 8 is a front view showing the positioning operation of the stereolithographic stage.
Figure 9:
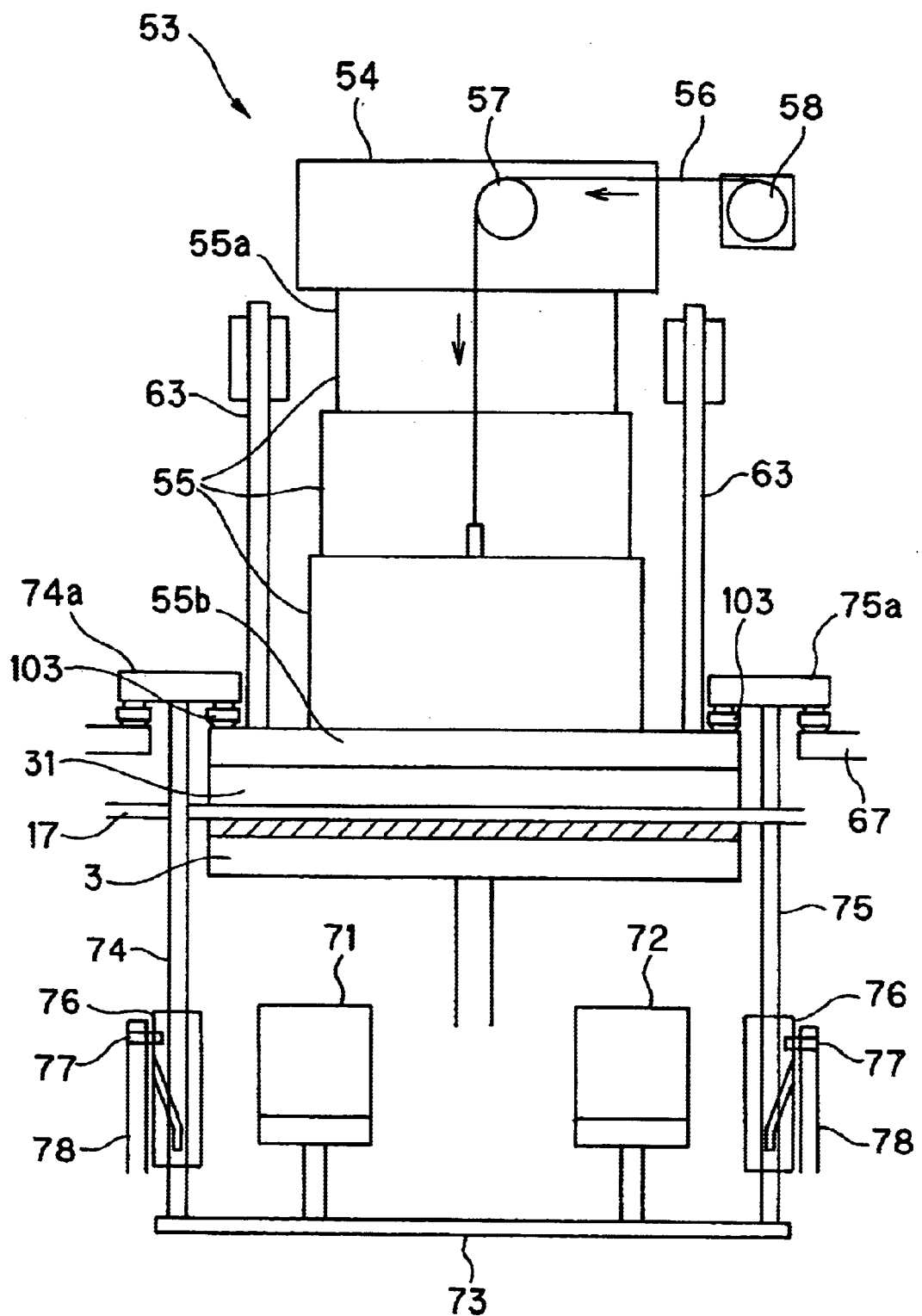
FIG. 9 is a front view of the stereolithographic apparatus when a hood of a light source (illumination apparatus) is moved downwardly.

As shown in FIG. 5, an exposure apparatus 53 for plane-exposing the photohardenable resin layer to light through the mask of the light-transmissible member 31 is provided at the upper side of the stereolithographic stage A. The exposing apparatus 53 has a fixed casing 54 containing a light source (not shown) such as a mercury lamp, a metal halide lamp, an UV fluorescent lamp or the like, and a hood 55 having an upper end portion 55a linked to the casing 54, and a lower end portion 55b which is downwardly moved so as to freely expand and contract in the form of bellows, thereby covering the mask portion of the light-transmissible member 31 as shown in FIGS. 8 and 9. In FIGS. 8 and 9, reference numeral represents a guide post.

The hood 55 is suspended by a wire 56, and the wire 56 is passed through a fixed pulley and linked to a take-up pulley 58. A belt 59 is suspended around the pulley 58 as shown in FIG. 5, and the belt 59 is also suspended around a pulley 61 fixed to the output shaft of a motor 60. In this embodiment, the hood 55 is moved upwardly/downwardly by rotating the motor 60 forwardly/reversely.

In the exposure process, the light source and the light-transmissible member 31 is required to be spaced from each other at such a distance as shown in FIG. 5. If the casing 54 and the hood 55 are integral with each other, the casing 54 must be further upwardly moved from the position of FIG. 5 after the exposing operation is carried out, and the overall height of the apparatus is increased. However, in this embodiment, the exposing apparatus is designed so that only the hood 55 is movable upwardly/downwardly, so that the overall height of the apparatus can be suppressed to a lower value.

When the hood 55 is downwardly moved to cover the mask portion of the light-transmissible member 31 the hood 55 and the light-transmissible member 31 are positioned in the stereolithographic stage A as described later.

Figure 10:
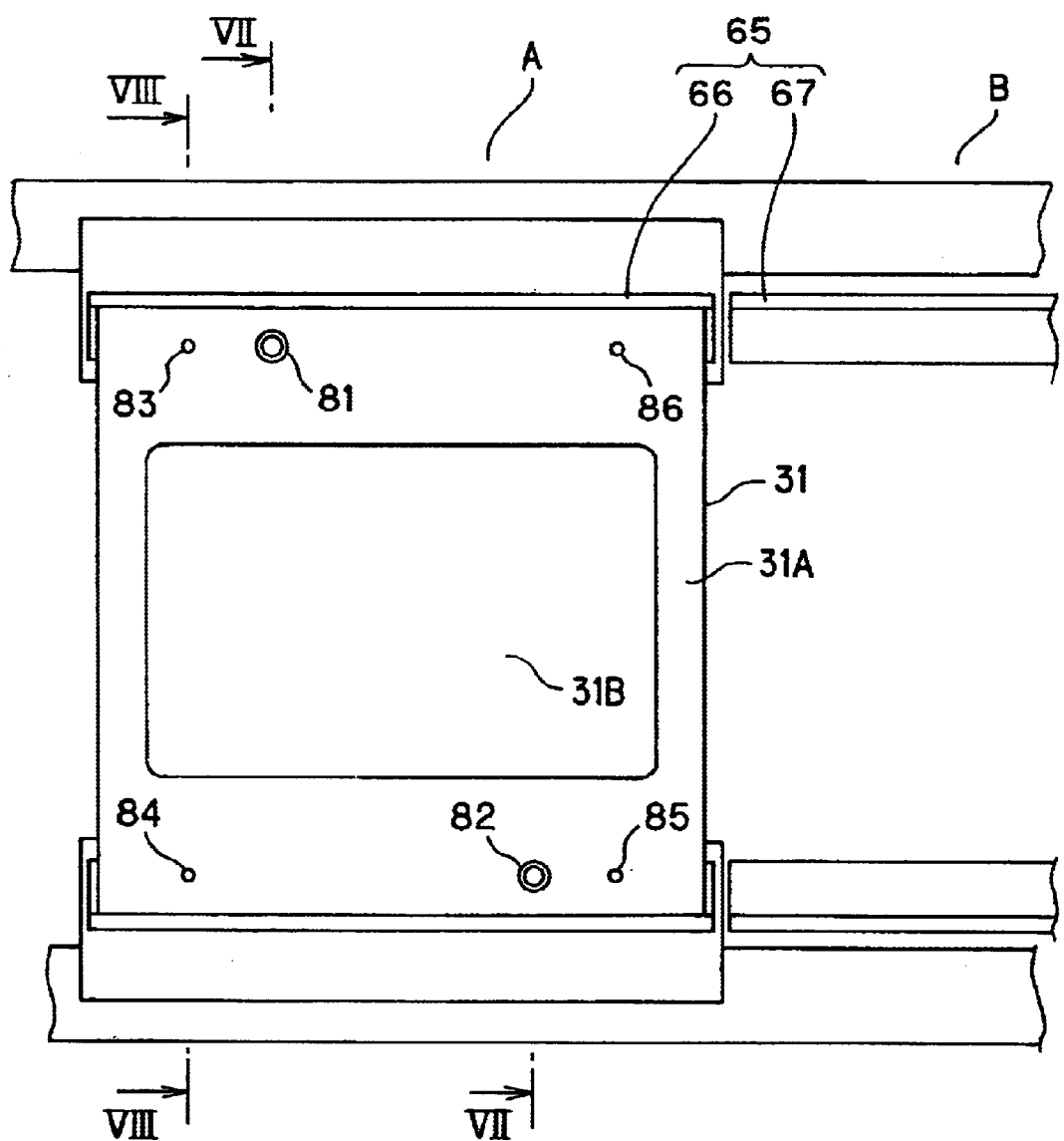
FIG. 10 is a plan view showing a stereolithographic stage.

As shown in FIG. 10, the light-transmissible member 31 is reciprocatively moved between the mask forming stage B and the stereolithographic stage A while supported by a pair of rails 65 having L-shaped section. The pair of rails 67 is divided into mask forming means side rails 66 and mount table side rails 67, and they are independently constructed.

Next, a positioning mechanism of the hood 55 and the light-transmissible member 31 will be described.

Referring to FIG. 8, a pair of cylinders 71 and 72 are disposed below the mount table 3. A horizontal bar 73 is linked to the rods of the respective cylinders 71, 72, and a pair of operating rods 74, 75 extending vertically upwardly are linked to both the ends of the horizontal bar 73 so as to be freely ratable around the axis of the horizontal bar 73. A sleeve 76 is fixed on the outer peripheral of each of the operating rods 74, 75, and a lead groove 76a is formed on the outer periphery of the sleeve 76. The lead groove 76a is designed so as to extend spirally, and a pin 77 fixed to a fixing member 78 is fitted in the lead groove 76a.

FIG. 10 shows a state that the light-transmissible member 31 enters the stereolithographic stage A. The light-transmissible member 31 has an aluminum glass frame 31A and a glass plate 31B fitted in the glass frame 31A, and the mask is drawn on the upper surface of the glass plate 31B. In the glass frame 31A are formed positioning pin holes 81, 82 which are formed so as to diagonally face each other and functions as a stopper for stopping the rotational motion of the light-transmissible member 31 on the horizontal plane, and height positioning pin holes 83 to 86 of the light-transmissible member 31.

Figure 11A:
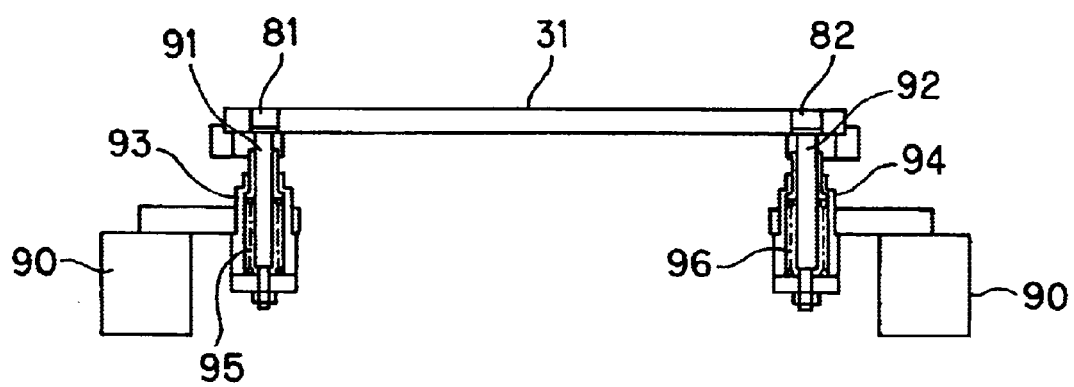
FIGS. 11A and 11B are cross-sectional views taken along VII—VII line of FIG. 10.
Figure 11B:
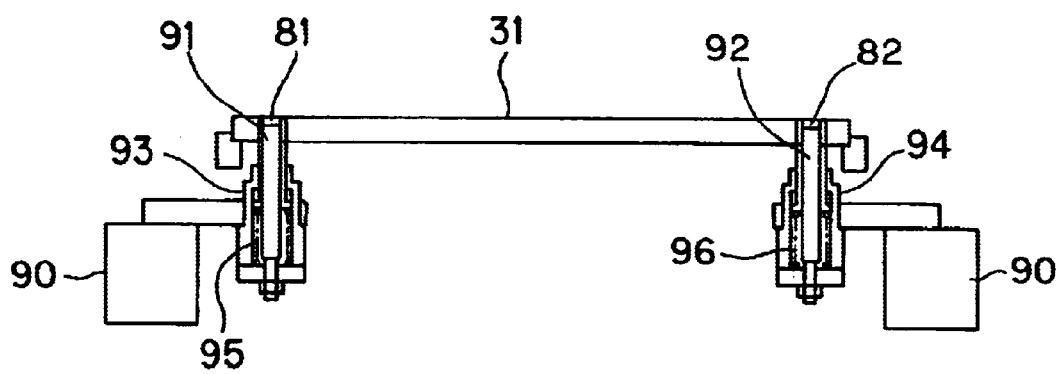
Figure 12A:
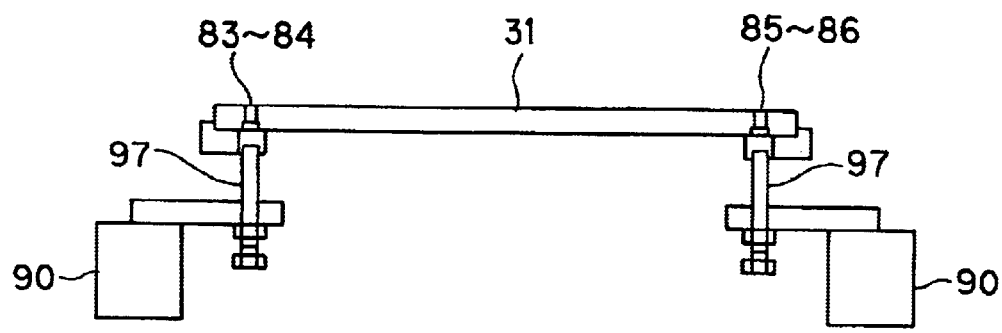
FIGS. 12A and 12B are cross-sectional views taken along VIII—VIII line of FIG. 10.
Figure 12B:
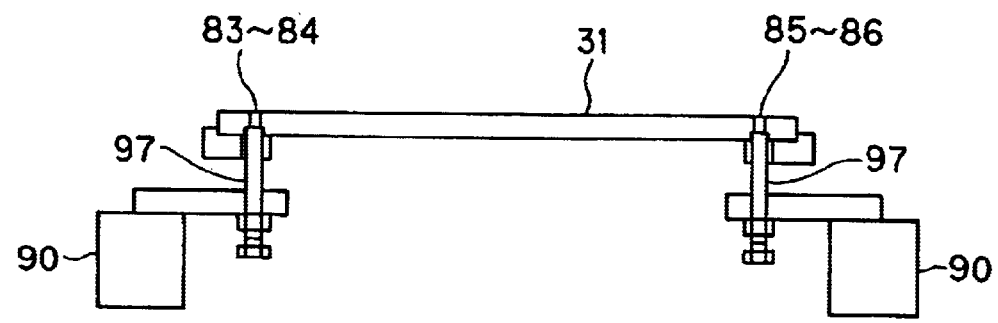

As shown in FIGS. 11A and 11B, positioning pins 91, 92 are detachably fitted in the positioning pin holes 81, 82. These pins 91, 92 are accommodated in bodies 93, 94 fixed to the fixing portion 90, and urged upwardly by springs 95, 96. Further, as shown in FIGS. 12A, 12B, positioning pins fixed to the fixing portion 90 abut against the height positioning pin holes 83 to 86.

Next, the positioning operation will be described.

Figure 13A:
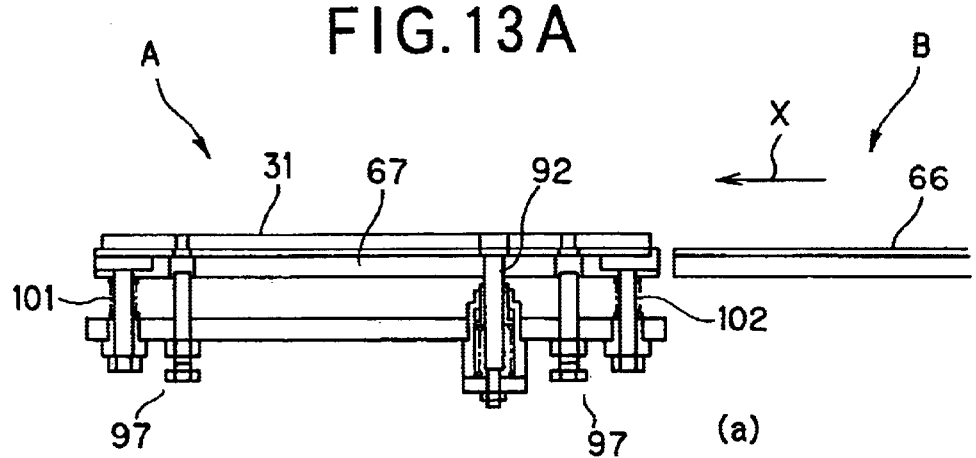
FIGS. 13A and 13B are front views showing the positioning operation in the stereolithographic stage.
Figure 13B:
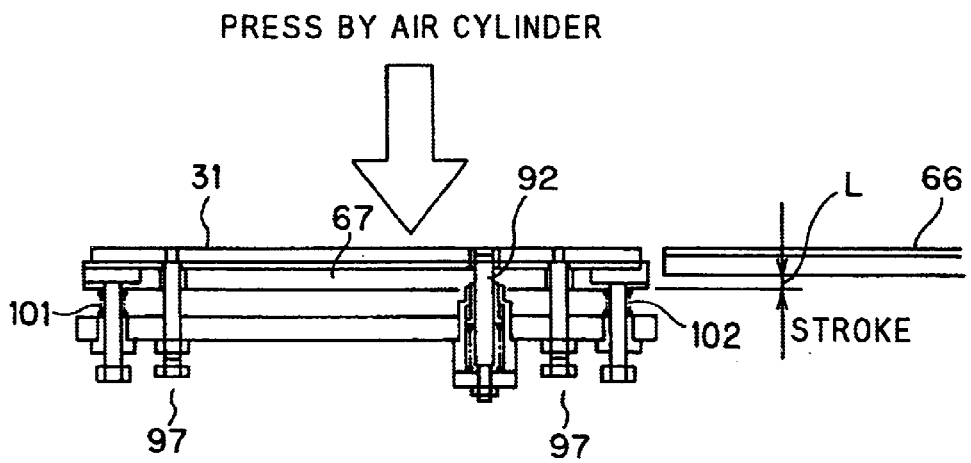

In the stereolithographic stage A, the mount table side rails 67 are supported by spring members 101 and 102 as shown in FIGS. 13A and 13B. In FIG. 13A, the mount table side rails 67 are located so as to capture the light-transmissible member 31, and the light-transmissible member 31 is fed through the mask forming means side rails 66 in the direction of the arrow X.

When the light-transmissible member 31 enters the stereolithographic stage A, the wire 56 is unreeled from the take-up pulley 58 to move the hood 55 downwardly, and the lower end 55b of the hood 55 abuts against the light-transmissible member 31.

In this state, the overall structure containing the hood 55 is supported by the spring force of the spring members 101; 102 as shown in FIG. 13A, and thus the positioning pins 91, 92, 97 are prevented from being fitted into the pin holes.

Subsequently, as shown in FIG. 9, the rods of the cylinders 71, 72 are expanded to push the horizontal bar 73 down, and the pair of operating rods 74, 75 are integrally moved downwardly. During the downward-moving process, the operating rods 74, 75 are rotated around the axis along the shape of the lead groves 76a, and the attitude (orientation) of fixers 74a, 75a at the upper ends of the operating rods 74, 75 are changed from that of FIG. 8 to that of FIG. 9, and the projections 103 of the fixers 74a, 75a pushes the lower end 55b of the hood 55.

As shown in FIG. 12A, the above push-down operation is stopped when the tips of the positioning pins 97 abut against the pin holes 83 to 86, whereby the height of the light-transmissible member 31 can be positioned with high precision. In this case, as shown in FIG. 11B, the tips of the positioning pins 81 and 82 are fitted into the pin holes 81, 82, and the rotation of the light-transmissible member 31 on the horizontal plane is suppressed. At the lowermost position, the light-transmissible member 31 is stopped while the springs 101 and 102 are warped by the distance of L as shown in FIG. 13B.

In this construction, if the mask position formed on the light-transmissible member 31 is positionally displaced with respect to the mount table 3, the precision of stereolithography is lowered.

In this embodiment, when the hood 55 is downwardly moved and covers the mask of the light-transmissible member 31, the hood 55, the light-transmissible member 31 and the rails 67 are linked to one another. Until the rails 67 abut against the height positioning pins 97, the hood 55, the light-transmissible member 31 and the rails 67 are pushed down against the spring force of the spring members 101 and 102, and the hood 55, the light-transmissible member 31 and the rails 67 are fixed at that position. Therefore, the position of the mask formed on the light-transmissible member 31 is not displaced with respect to the mount table 3, and thus the stereolithographic operation can be performed with high precision.

Figure 14:
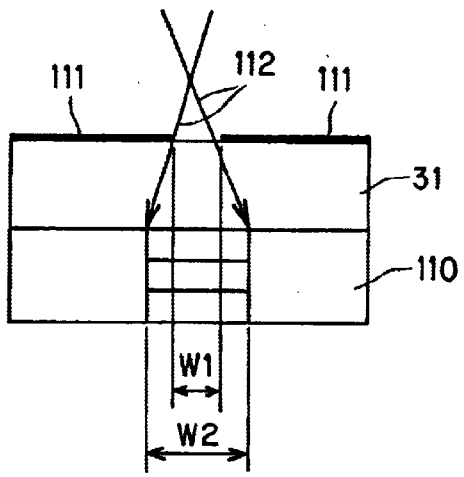
FIG. 14 is a diagram showing the exposing principle.

The exposure apparatus 53 is provided with means for allowing parallel light to be effectively incident to the light-transmissible member 31. FIG. 14 is a diagram showing the principle of this means.

When the light-transmissible member 31 having a mask 111 formed thereon is mounted on the unhardened resin layer 110 and then light (UV) is irradiated from an UV source through the mask 111 onto the unhardened resin layer 110, the light thus irradiated reaches the unhardened resin layer 110 while spreading laterally after it passes through the mask 111 because the thickness of the light-transmissible member 31 is large. Accordingly, the unhardened resin layer 110 is exposed to light at a width of W2 although it is originally required to be exposed to light at a width of W1, so that "blur" occurs at both boundary sides of the width W1, and thus extra hardening occurs.

Figure 15:
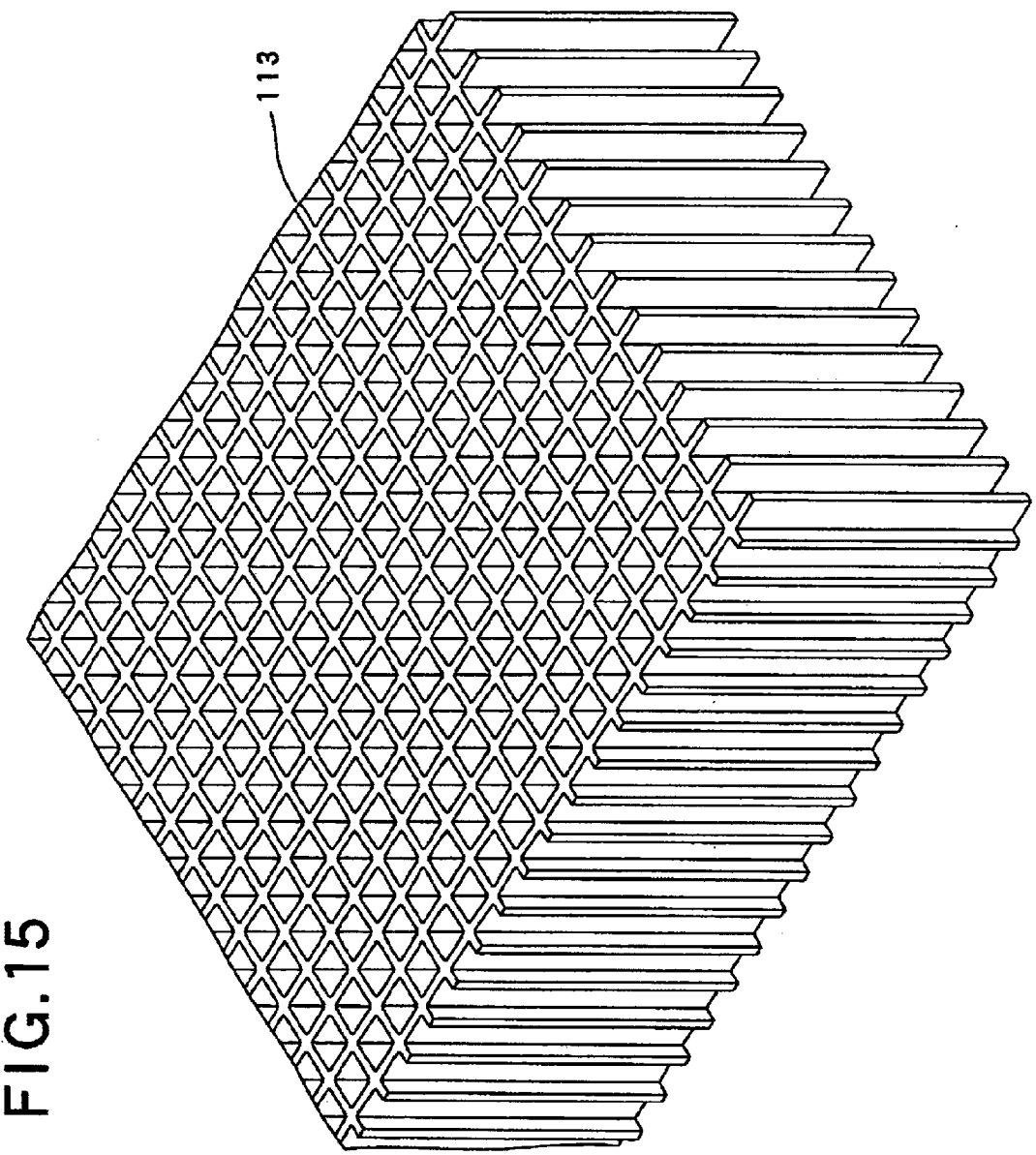
FIG. 15 is a perspective view showing a grid for emitting parallel light therethrough.

In this embodiment, a substantially honeycomb-shaped grid 113 as shown in FIG. 15 is provided between the exposure apparatus 53 and the light-transmissible member 31. For example, the grid 113 may be secured to the inner side of the lower end 55b of the hood 55.

The parallel light is formed by the grid 113 and then irradiated onto the light-transmissible member 31, whereby the above problem can be solved.

Figure 16:
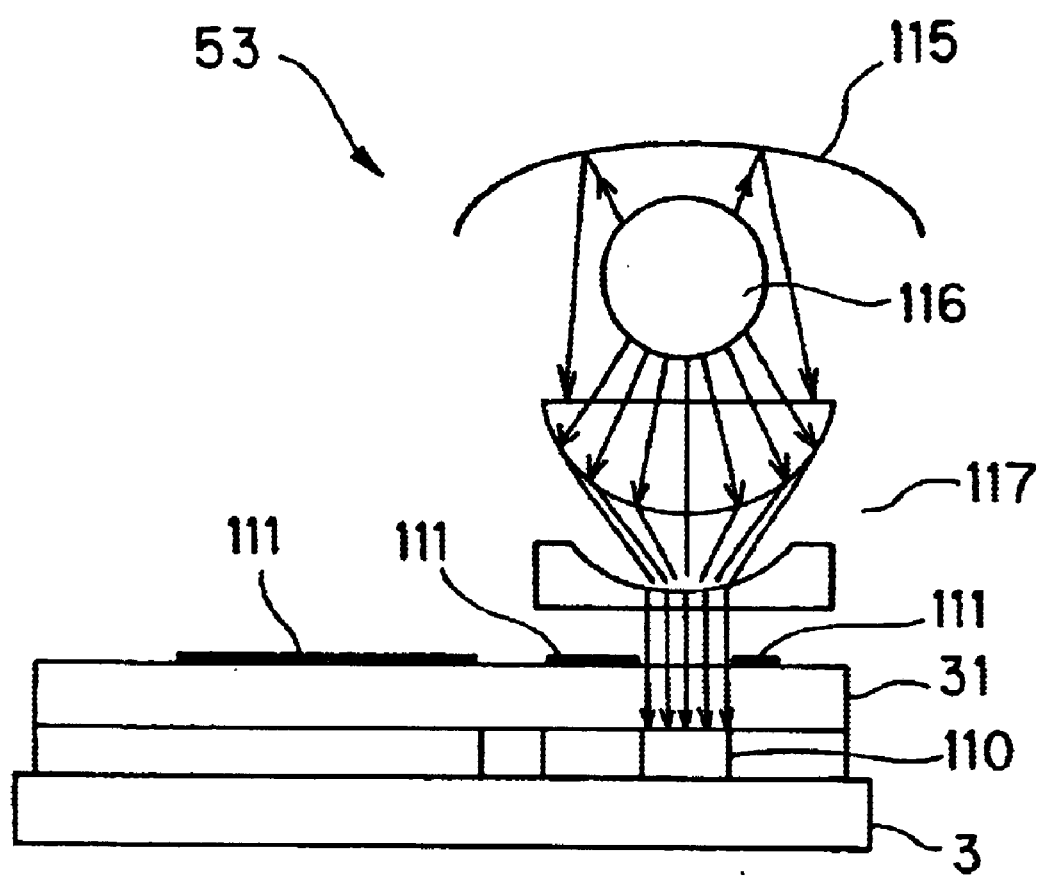
FIG. 16 is a diagram showing another embodiment of emitting parallel light.

In order to form parallel light, the exposure apparatus 53 may be constructed by a reflection plate 115, a light source 116 and a cylindrical lens 117 for forming parallel light as shown in FIG. 16. The parallel light emitted from the cylindrical lens 117 is passed through the mask 111 and reaches the unhardened resin layer in the form of parallel light. In this case, the exposure apparatus 53 is required to be movable along the surface of the light-transmissible member 31.

In the exposure apparatus 53, the light source continues to be turned on at all times. Therefore, when no exposure is carried out, the light emitted from the light source is intercepted by a shutter.

Figure 17:
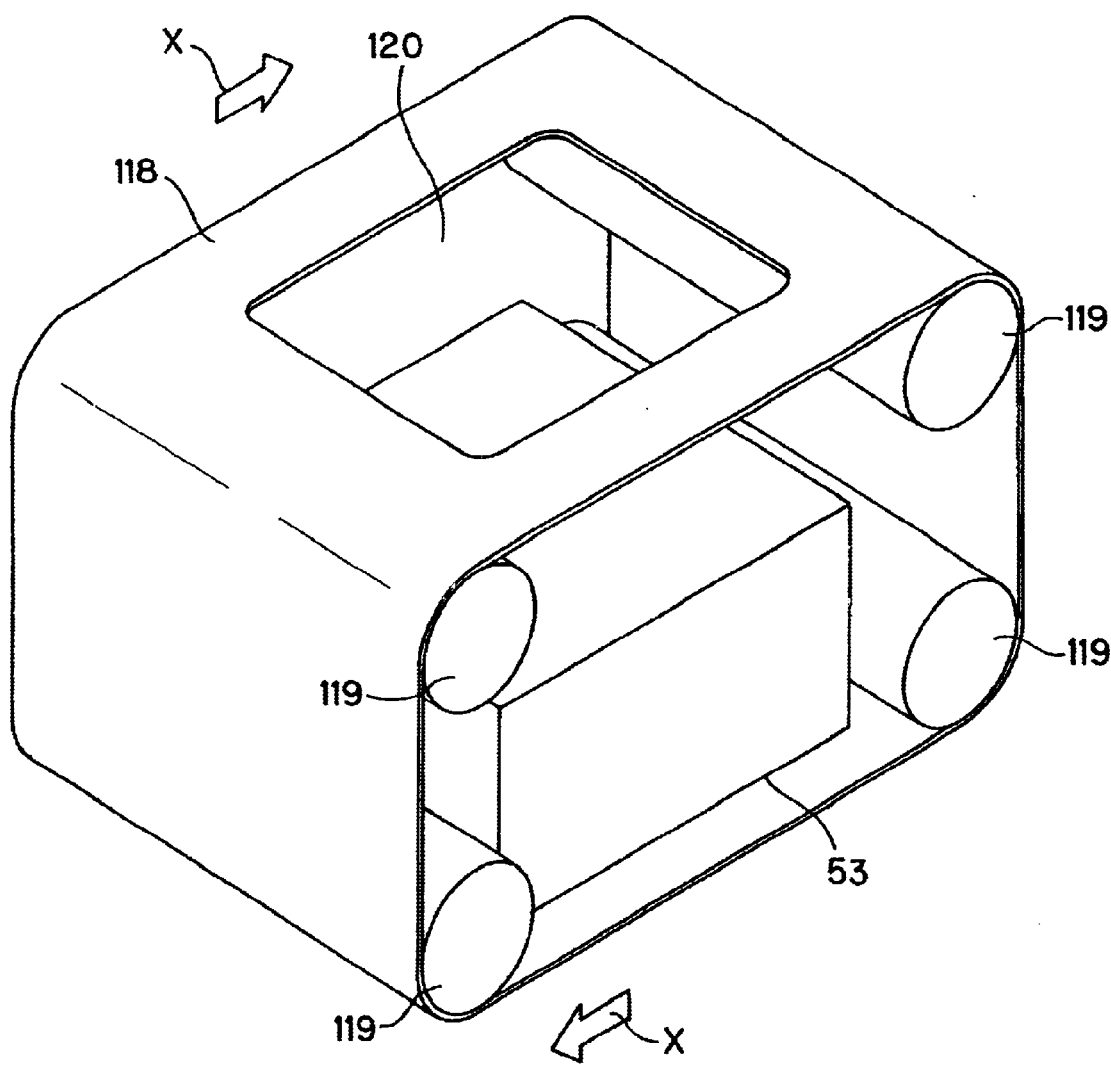
FIG. 17 is a perspective view showing a shutter.

FIG. 17 shows the construction of the shutter. As shown in FIG. 17, the shutter has a light non-transmissible sheet 118 suspended among four rollers 119, and an light-transmissible opening portion 120 is formed in the sheet 118.

The exposure apparatus 53 having the light source which continues to be turned on at all times is disposed inside the sheet 118, and the exposure apparatus 53 has a light irradiation port at the bottom surface thereof (not shown).

FIG. 17 shows a light interception state of the shutter. When the sheet 118 is rotated in the direction of an arrow X and the light-transmissible opening portion 120 is confronted to the light irradiation port, the exposure is carried out. A plurality of light-transmissible opening portions 120 may be formed in the sheet insofar as it is possible in shutter design.

When the sheet 118 is rotated in the direction of the arrow X and the irradiation port is opened to the outside, the light irradiation port starts to open from the right end in FIG. 17. Accordingly, the exposure amount at the right end is larger than that at the left end. However, when the sheet 118 is rotated in the direction of the arrow X and the light irradiation port is closed, the light irradiation port starts to be closed from the right end in FIG. 17. Therefore, the exposure amount at the right end is lower than that at the left end.

Accordingly, in this embodiment, the exposure amount at any one of the right and left ends of the light irradiation port is prevented from being increased/reduced as compared with the exposure amount at the other end, and thus the exposure amount is averaged over the light irradiation port. Therefore, the unhardened resin layer can be perfectly hardened.

FIGS. 18A to 18C are diagrams showing the construction of another shutter.

The shutter of this embodiment has a plurality of light non-transmissible plates 121 at the light irradiation port of the exposure apparatus 53 while the plates 121 are shared to the right-hand and left-hand sides. For example, each of the light non-transmissible plate 121 comprises three plates which are linked to one another so as to be freely expanded and contracted. FIG. 18A shows a case where the light non-transmissible plate 121 at the right-hand side is disposed to close the light irradiation port, FIG. 18B shows a case where the light irradiation port is opened and FIG. 18C shows a case where the light non-transmissible plate 121 at the left-hand side is disposed so as to close the light irradiation port.

In this embodiment, the shutter is constructed the plural light non-transmissible plates 121 which are linked to one another so as to be freely expanded and contracted, and the light exposure/interception operation is controlled by alternately changing the open/close direction of the shutter. Therefore, at the open/close time of the light irradiation port, the exposure amount of only one end of the light irradiation port can be prevented from increasing more greatly than that at the other end. Therefore, the exposure amount can be averaged, and the perfect hardening of the unhardened photohardenable resin layer can be achieved. The shutter of the present invention is not limited to the above shutter comprising plural light non-transmissible plates 121 which are linked to one another so as to be freely expanded and contracted, and it may comprise a single light non-transmissible plate.

When the stereolithographic operation for one layer is completed in the stereolithographic stage A, the light-transmissible member 31 is fed to the mask forming stage B as described above.

In the mask forming stage B, the mask is removed from the light-transmissible member 31, and a new mask is formed on the light-transmissible member 31. In the process of forming a mask on the light-transmissible member, the light-transmissible member 31 is guided and moved along the two mask forming means side rails 66, and pressed from one rail side to the other rail side to be positioned in the width direction thereof. In this case, a press roller or the like may be provided to one rail side.

As described above, the mask is formed on the light-transmissible member 31 thus positioned, so that the position of the mask can be determined with high precision.

The present invention is not limited to the above embodiment, and various modifications may be made to the above embodiment.

For example, in the above embodiment, the three-dimensional object is stereolithographically formed and laminated in the vertical direction. However, when a large-scale three-dimensional object is formed, it is not stereolithographically laminated in the vertical direction, but may be stereolithographically laminated in the lateral direction. In this case, the stereolithographic apparatus is designed so that the stereolithographic table is laterally moved back layer by layer or means for forming a photohardenable resin layer is moved back in the lateral direction layer by layer.

In the above embodiments, the light-transmissible member having the mask is disposed on the unhardened photohardenable resin layer or the light-transmissible film while it is kept in close contact with the unhardened photohardenable resin layer or the light-transmissible film. However, in the present invention, the light-transmissible member having the mask may be disposed above the unhardened photohardenable resin layer or the light-transmissible film, that is, it is not necessary to keep the light-transmissible member having the mask in close contact with the unhardened photohardenable resin layer or the light-transmissible film.

According to the embodiment of the present invention, the plane-exposure can be performed with a simple construction. Therefore, the exposure speed can be more enhanced as compared with the conventional scan system, and the stereolithographic processing time can be shortened. In addition, processing such as cutting, etc. is not required after the exposure operation, and the stereolithographic operation can be performed with high precision.

Next, other embodiments of the stereolithographic apparatus and method of the present invention will be described.

In this embodiment, the three-dimensional object is formed according to the following process: a step (i) of supplying (coating) photohardenable resin (photohardenable resin composition) onto a stereolithographic table (mount table), and irradiating light to the surface of the photohardenable resin on the mount table under control to form a photohardened photohardenable resin layer (hereinafter referred to as "photohardened layer") having a predetermined pattern and a predetermined thickness; a step (ii) of supplying (coating) a layer of photohardenable resin onto the photohardened layer formed in the step (i) and then irradiating light onto the photohardenable resin layer under control to integrally form and laminate a photohardened layer having predetermined pattern and thickness on the photohardened layer formed in the step (i); a step (iii) of supplying (coating) a layer of photohardenable resin onto the photohardened layer formed in the step (ii) and then irradiating light onto the photohardenable resin layer under control to integrally form a photohardened layer having predetermined pattern and thickness on the photohardened layer formed in the step (ii); and a step (iv) of repeating the forming and laminating step of the photohardened layer in the step (iii) until a desired three-dimensional object is obtained.

According to this embodiment, when the three-dimensional object is manufactured through a series of steps (i) to (iv), it is required to use photohardenable resin which has a melting temperature ranging from 5 to 90° C. when it is unphotohardened, that is, it is not optically hardened, and whose phase is reversibly shifted from the solid state to the liquid state or from the liquid state to the solid state with the melting temperature at the boundary between the solid and liquid states. The melting temperature of the photohardenable resin preferably ranges from 15 to 80° C., and more preferably ranges from 20 to 60° C.

Here, the term "melting temperature" used in this specification is defined as a temperature when the photohardenable resin is substantially varied from the non-fluid state to the fluid state due to increase of temperature.

If the melting temperature of the photohardenable resin is lower than 5° C., when a photohardenable resin layer constituting the same surface as a photohardened layer which has been already formed is kept solid to function as a support layer for a layer of photohardenable resin to be supplied onto the solid photohardenable resin layer, it is difficult to cool and solidify the photohardenable resin layer, that is, it is difficult to keep the photohardenable resin layer solid. In addition, strong cooling is required to cool and solidify the photohardenable resin layer, and this is ineffective in thermal efficiency.

On the other hand, if the melting temperature of photohardenable resin is higher than 90° C., high-temperature heating is required in the process of repetitively supplying a layer of photohardenable resin in the form of liquid onto a mount table or a photohardened layer which has been already formed and exposing light to the photohardenable resin layer to laminate a subsequent photohardened resin layer on a previous photohardened resin layer. In addition, even when the temperature is slightly reduced, the photohardenable resin composition is solidified and the supplying (coating) operation of the photohardened resin is hardly carried out. Further, high-temperature heating is also required in the process of heating the solid photohardenable resin up to the melting temperature or more to liquefy the solid photohardenable resin and then separating the liquefied photohardenable resin from the three-dimensional object finally obtained after the stereolithographic operation is completed, resulting in reduction of workability and thermal efficiency.

The photohardenable resin used in this embodiment may have a sharp melting point (for example, 30° C.) or a melting temperature having some width (for example, from 30 to 35° C.) insofar as the melting temperature thereof ranges from 5 to 90° C.

Further, in this embodiment, the kind of the photohardenable resin is not limited to any specific one and any kind of photohardenable resin (photohardenable resin composition) can be used insofar as it is usable for the stereolithography (i.e., a three-dimensional object can be optically formed with the photohardenable resin) and also has a melting temperature ranging from 5 to 90° C.

In this embodiment, any one of the following manners (I) and (II) is required to be used when a desired three-dimensional object is manufactured by the series of steps (i) to (iv) by using photohardenable resin having a melting temperature ranging from 5 to 90° C.:

(I) in all the steps (ii) to (iv), photohardenable resin (composition) constituting the same surface as a photohardened layer which has been already formed is kept solid under a temperature less than the melting temperature thereof, and under this solid state a layer of photohardenable resin (composition) is supplied onto the surface concerned and exposed to light under control to thereby integrally form and laminate a photohardened layer on the surface concerned to form a three-dimensional object, and (II) in a part of the steps (ii) to (iv), in all the steps (ii) to (iv), photohardenable resin (composition) constituting the same surface as a photohardened layer which has been already formed is kept solid under a temperature less than the melting temperature thereof, and under this solid state a layer of photohardenable resin (composition) is supplied onto the surface concerned and exposed to light under control to thereby integrally form and laminate a photohardened layer on the surface concerned to form a three-dimensional object.

Here, the term "solid state" means a state having no fluidity, and it contains wax type, jelly type, gel type, etc.

Particularly when the manner of (II) is adopted, in a process of stereolithographically forming a portion at which suspension, deformation or positional displacement or the like might occur if no support is used in the stereolithographic process, for example, an overhang portion, separately-mounted portions, plural leg portions which are different in length, an uneven portion or the like, it is required to carry out the stereolithographic operation while photohardenable resin constituting the same surface as a photohardened layer which has been already formed is kept at a temperature less than the melting temperature thereof to keep the photohardenable resin in a solid state, thereby making the photohardenable resin concerned function as a support layer. On the other hand, in a process of stereolithographically forming a portion at which suspension, deformation, positional displacement, etc. do not occur even if no support is used in the stereolithographic process, the stereolithographic operation may be carried out irrespective of the state (liquid or solid) of photohardenable resin constituting the same surface as a photohardened layer which has been already formed, that is, it may be carried out without cooling and solidifying the photohardenable resin concerned to thereby keep the photohardenable resin liquid, or with cooling and solidifying the photohardenable resin concerned to thereby keep the photohardenable resin solid.

When the method (I) described above is adopted, a desired three-dimensional object obtained at the time when the stereolithographic process is completed is kept in such a state that it is surrounded by the unhardened photohardenable resin under solid state (i.e., the desired three-dimensional object is embedded in the unhardened photohardenable resin (composition) under cool and solid state). Therefore, the desired three-dimensional object can be separated from the unhardened photohardenable resin by heating the article thus obtained up to the melting temperature of the photohardenable resin or more to liquefy the solid photohardenable resin. Further, the unhardened photohardenable resin thus liquefied can be withdrawn and directly reused for the subsequent stereolithographic process.

When the method (II) is adopted, the unhardened photohardenable resin (composition) which has not been subjected to the photohardening (i.e. has not contribute to the formation of the desired three-dimensional object) has been already liquefied and separated from the desired three-dimensional object when the stereolithographic process is completed, and thus the desired three-dimensional object can be directly picked up. In addition, the liquid unhardened photohardenable resin (composition) can be directly withdrawn and reused for the subsequent stereolithographic process.

If necessary, the solid unhardened photohardenable resin may be dissolved with solvent to separate the dissolved photohardenable resin from the desired three-dimensional object. In this case, any material may be used as the solvent insofar as it dissolves the unhardened photohardenable resin, but does not dissolve the photohardened three-dimensional object, and also it is preferable that the solvent does not disturb the physical properties of the photohardenable resin.

In this embodiment, when a layer of photohardenable resin (composition) is supplied onto the mount table and/or the surface of a solid unhardened photohardenable resin (composition) layer constituting the same surface as a photohardened resin layer which has been formed, any one of the following methods (a) to (d) may be used:

(a) a method of supplying a photohardenable resin composition in a liquid form, exposing the photohardenable resin composition to light under control to form a photohardened layer having predetermined pattern and thickness;

(b) a method of supplying a photohardenable resin composition in a liquid form, cooling the photohardenable resin composition to keep it at a temperature less than the melting temperature to solidify the photohardenable resin composition and then exposing the surface of the solid photohardenable resin composition to light under control to form a photohardened layer having predetermined pattern and thickness;

(c) a method of supplying a photohardenable resin composition in a solid state, heating the photohardenable resin composition to keep it at a temperature above the melting temperature to liquefy the solid photohardenable resin composition, and then exposing the liquid surface of the liquefied photohardenable resin composition to light under control to form a photohardened layer having predetermined pattern and thickness; and (d) a method of supplying a photohardenable resin composition in a solid state, and then exposing the surface of the solid photohardenable resin composition to light under control to form a photohardened layer having predetermined pattern and thickness.

In the case where the method (a) is adopted, the stereolithographic method comprises the following steps:

(i) a step of irradiating light to the surface of liquid photohardenable resin (liquid photohardenable resin composition) on the mount table under control to form a photohardened layer having predetermined pattern and thickness;

(ii) a step of keeping the unhardened photohardenable resin constituting the same surface as the photohardened layer formed in the step (i) at a temperature less than the melting temperature of the unhardened photohardenable resin to solidify the unhardened photohardenable resin;

(iii) supplying a layer of liquid photohardenable resin onto the solid unhardened photohardenable resin layer formed in the step (ii), and irradiating light to the surface of the liquid photohardenable resin under control to form a photohardened layer having predetermined pattern and thickness on the photohardened layer formed in the step (i);

(iv) a step of keeping the unhardened photohardenable resin layer constituting the same surface as the photohardened layer formed in the step (iii) at a temperature less than the melting temperature thereof to solidify the unhardened photohardenable resin layer;

(v) a step of supplying a layer of photohardenable resin under liquid state on the solid unhardened photohardenable resin layer formed in the step (iv), and irradiating light to the surface of the liquid photohardenable resin; and (vi) a step of repeating the steps (iv) and (v) to obtain a desired a three-dimensional object.

In the case where the method (b) is used, the stereolithographic method comprises the following steps:

(i) a step of supplying photohardenable resin under liquid state onto the mount table and then cooling the photohardenable resin at a temperature less than the melting temperature thereof to solidify the photohardenable resin;

(ii) a step of irradiating light to the surface of the photohardenable resin solidified in the step (i) under control to form a photohardened layer having predetermined pattern and thickness;

(iii) a step of supplying a layer of photohardenable resin under liquid state onto the solid photohardenable layer after the step (ii) under cooling;

(iv) a step of cooling the photohardenable resin supplied in the step (iii) at a temperature less than the melting temperature thereof to solidify the photohardenable resin;

(v) a step of irradiating the surface of the photohardenable resin solidified in the step (iv) to form a photohardened layer having predetermined pattern and thickness; and (vi) a step of repeating the steps (iii) to (v) until a desired three-dimensional object is formed.

In the case where the method (c) is adopted, the stereolithographic method comprises the following steps:

(i) a step of supplying photohardenable resin in a solid state onto the mount table and then heating it up to the melting temperature thereof or more to liquefy the solid photohardenable resin, and then irradiating light to the surface of the photohardenable resin thus liquefied under control to form a photohardened layer having predetermined pattern and thickness;

(ii) a step of cooling the photohardenable resin constituting the same surface as the photohardened layer formed in the step (i) to keep it at a temperature less than the melting temperature and solidify the photohardenable resin;

(iii) a step of supplying a layer of solid photohardenable resin onto the solid photohardenable resin formed in the step (ii);

(iv) a step of heating the photohardenable resin layer formed in the step (iii) to the melting temperature or more to liquefy the photohardenable resin, and irradiating light to the surface of the liquefied photohardenable resin under control to form a photohardened layer having predetermined pattern and thickness; and (v) a step of repeating the steps (iii) to (v) until a desired three-dimensional object is formed.

In the case where the method (d) is adopted, the stereolithographic method comprises the following steps:

(i) a step of supplying photohardenable resin under solid state onto the mount table, and irradiating light to the surface of the solid photohardenable resin under control to form a photohardened layer having predetermined pattern and thickness;

(ii) a step of supplying layer of solid photohardenable resin on the photohardened resin formed in the step (i) and the solid photohardenable resin constituting the same surface as the photohardened layer while keeping the solid photohardenable resin at a temperature less than the melting temperature thereof to keep the photohardenable resin under the solid state;

(iii) a step of irradiating light to the surface of the solid photohardenable resin supplied in the step (ii) to form a photohardened layer having predetermined pattern and thickness; and (iv) a step of repeating the steps (ii) and (iii) until a desired three-dimensional object is formed.

When the photohardenable resin under solid state is supplied onto the mount table and/or the surface of the photohardened layer and the surface of the photohardenable resin which constitutes the same surface as the photohardened layer and is cooled and solidified, the photohardenable resin may be supplied in the form of a sheet, film or thin film, or it may be supplied in the form of powder. When the photohardenable resin composition is supplied in the form of a sheet, film or thin film onto the mount table or onto the surfaces of the photohardened layer and the photohardenable resin which constitutes the same surface as the photohardened layer and is cooled and solidified, and then directly exposed to light without liquefaction while it kept in the form of a sheet, film or thin film to be photohardened, there does not occur any uplift of the photohardenable resin which would occur on the surface thereof due to surface tension induced in the liquid photohardenable resin composition, and thus the photohardenable resin can be photohardened while kept under a flat state. Therefore, the comer portions of the three-dimensional object thus obtained are not rounded, and it can be formed with a flat surface and with high dimensional precision.

Further, when the photohardenable resin is supplied in the form of solid powder onto the mount table or the surfaces of the photohardened layer and the cooled and solidified photohardenable resin constituting the same surface as the photohardened layer and then directly exposed to light without liquefaction while it is kept in the solid powder, a porous three-dimensional object can be obtained.

In the present invention, the method of cooling the photohardenable resin composition constituting the same surface as the photohardened layer to keep the photohardenable resin composition at a temperature less than the melting temperature is not limited to a special method, and any method may be used insofar as the photohardenable resin constituting the same surface as the photohardened layer can be smoothly cooled and solidified. For example, there can be used a method of performing the stereolithographic process in a cooling room in which the room temperature is kept to a temperature less than the melting temperature of the photohardenable resin, a method of spraying cooling fluid (gas or liquid) kept at a temperature less than the melting temperature onto the surface of the photohardenable resin composition constituting the same surface as the photohardened layer which has been already formed, etc.

The method of manufacturing the three-dimensional object according to this embodiment may be performed by using a stereolithographic apparatus provided with photohardenable resin supply means for successively supplying a layer of photohardenable resin onto the mount table or a photohardened layer which is formed by hardening the photohardenable resin (composition), stereolithographic means having a light irradiation device for repetitively carrying out formation/lamination of a photohardened layer having predetermined pattern and thickness under control until a finally desired three-dimensional object is formed, and temperature adjusting means for cooling the photohardenable resin to keep it at a temperature less than the melting temperature thereof.

In the stereolithographic apparatus of the present invention, as the temperature adjusting means is preferably used cooling means having a controller for keeping the photohardenable resin constituting the same surface as the photohardened layer at a temperature less than the melting temperature in a part of the stereolithographic process or in the overall stereolithographic process.

The stereolithographic apparatus may contain heating means for heating unhardened photohardenable resin existing in a stereolithographically formed object to keep it at a temperature above the melting temperature thereof in some midpoint of the stereolithographic process or after the stereolithographic process.

In the method and apparatus according to the above embodiment of the present invention, the method of irradiating light to photohardenable resin is not limited to a special method. For example, the photohardened layer may be formed by irradiating light beams to the photohardenable resin in the form of a spot (in a drawing style), by irradiating light beams to the photohardenable resin in the linear form, or by irradiating light beams to the photohardenable resin in the form of a plane. Further, the type of the light to be irradiated to the photohardenable resin is not limited to a special one, and any light may be used. For example, all activated energy light beams emitted from Ar laser, He—-Cd laser, xenon lamp, metal halide lamp, mercury lamp, fluorescent lamp, etc. may be used. OF these light beams, the laser beams are preferably used from the viewpoint of the high stereolithographic speed, the high stereolithographic precision, etc. Still further, the intensity of the light beams to be irradiated, the distance between the surface of the photohardenable resin composition and the light source, etc. may be properly determined in accordance with various situations.

Figure 1:
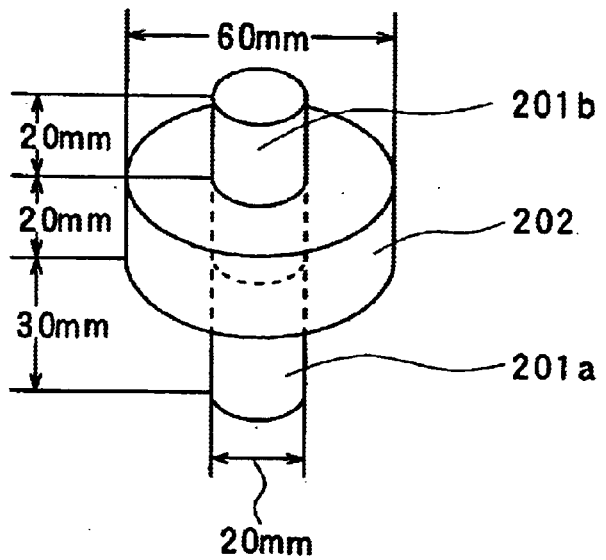
FIG. 1 is a diagram showing an example of a three-dimensional object having an overhang portion.

In order to make clearer the understanding of the stereolithographic method of this embodiment, a process of manufacturing the three-dimensional object as shown in FIG. 1 by using the stereolithographic method of this embodiment will be described with reference to FIGS. 19A to 19M, however, the present invention is not limited to the following process.

Photohardenable resin R1 having a melting temperature ranging from 5 to 90° C. when it is unhardened is first supplied (coated, poured, or the like onto a mount table (stereolithographic table) on which a three-dimensional object (stereolithographic object) is mounted [FIG. 19A], and then light is irradiated to the photohardenable resin R1 under control from the upper side to form a photohardened layer Rc1 having predetermined pattern (a circular shape having the diameter corresponding to the lower end surface of a cylindrical portion 201a) and thickness [FIG. 19B]. Subsequently, the unhardened photohardenable resin R1 constituting the same surface as the photohardened layer Rc1 is kept at a temperature less than the melting temperature thereof to be kept under solid state Rs1 [FIG. 19C]. A layer of photohardenable resin R2 is supplied onto the surfaces of the photohardened layer Rc1 and the surface of the solid unhardened photohardenable resin Rs1 while keeping the unhardened photohardenable resin Rs1 solid [FIG. 19D], and then exposed to light under control to integrally form and laminate a photohardened layer Rc2 [FIG. 19E]. Subsequently, the unhardened photohardenable resin R2 constituting the same surface as the photohardened layer Rc2 is kept at a temperature less than the melting temperature thereof and under the solid state Rs2 [FIG. 19F]. Subsequently, the same steps are repeated to stereolithographically form the three-dimensional object Rc corresponding to the cylindrical portion la on the mount table 211 [FIG. 19G]. The three-dimensional object Rc is surrounded at the side thereof by the unhardened photohardenable resin Rs which have been kept solid at a temperature less than the melting temperature.

Subsequently, the unhardened photohardenable resin Rs is made to function as a support member while it is kept solid at a temperature less than the melting temperature. Under this state, a layer of photohardenable resin S1 is supplied onto the surface of Rs and Rc to form a disc portion 20 corresponding to an overhang portion [FIG. 19H], and then exposed to light under control to integrally form and laminate a photohardened layer Sc1 having a predetermined pattern (the cylindrical shape having the diameter corresponding to the lower end surface of the disc portion 202) and a predetermined thickness [FIG. 19I].

Subsequently, a layer of photohardenable resin S2 is supplied onto the unhardened photohardenable resin constituting the surface as the photohardened layer Sc1 while the unhardened photohardenable resin is kept solid at a temperature less than the melting temperature thereof, and then exposed to light under control to integrally form and laminate a photohardened layer thereon [FIG. 19J]. Subsequently, the above steps are repeated to form the three-dimensional object part corresponding to the disc portion 202 [FIG. 19K]. Further, the same stereolithographic operation is repeated to form the three-dimensional object part corresponding to the cylindrical portion 201b, whereby the three-dimensional object A shown in FIG. 1 is formed on the mount table 211 while being surrounded by the cooled and solid unhardened photohardenable resin composition Rs [FIG. 19L].

Subsequently, the three-dimensional object A is heated at the melting temperature of the photohardenable resin while it is mounted on the mount table 211 or after it is put off the mount table 211, whereby the three-dimensional object A and the liquid photohardenable resin R are separated from each other and withdrawn [FIG. 19M].

In the above-described series of stereolithographic steps, when the disc portion 2 having an overhang portion is formed, it is necessary that the unhardened photohardenable resin constituting the same surface as the photohardened layer which has been already formed just below a layer of photohardenable resin to be supplied is kept solid at a temperature less than the melting temperature in order to prevent the overhang portion from hanging down or being deformed. However, the cylindrical portion 201b located above the disc portion 202 is mounted on the disc portion 202 having a larger diameter than that of the cylindrical portion 201b, and thus it has no overhang shape, so that there is no probability that the hang-down or deformation occurs in the stereolithographic process for the cylindrical portion 201b. Accordingly, the unhardened photohardenable resin constituting the same surface as the photohardened layer which has been already formed just below a layer of photohardenable resin to be supplied may be left liquid unlike the above case. In this case, at the time when the stereolithographic process is completed, the unhardened photohardenable resin is kept liquid and thus it has been already separated from the desired three-dimensional object, so that any work of separating the unhardened photohardenable resin from the desired three-dimensional object is not required.

Figure 4A:
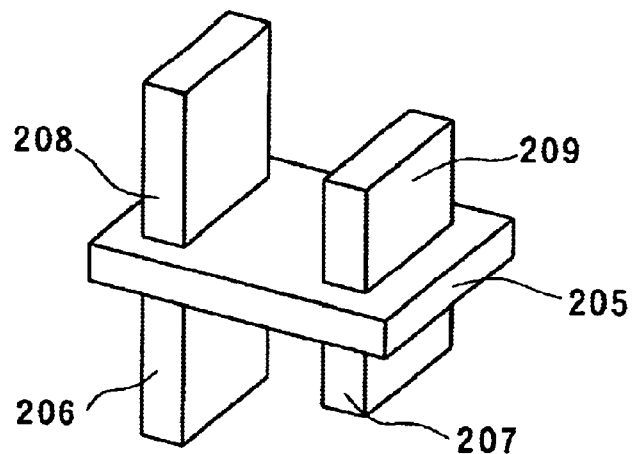
FIGS. 4A to 4F show an example of a three-dimensional object having right and left legs different in length and a process of forming the three-dimensional object when it is manufactured by the conventional stereolithographic method (support attaching method)
Figures 4B, 4C, 4D:
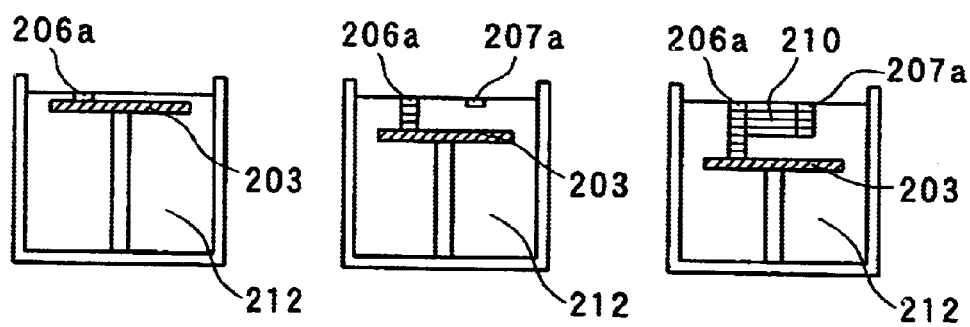
Figure 4E:
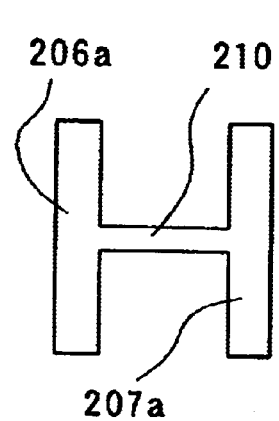
Figure 4F:
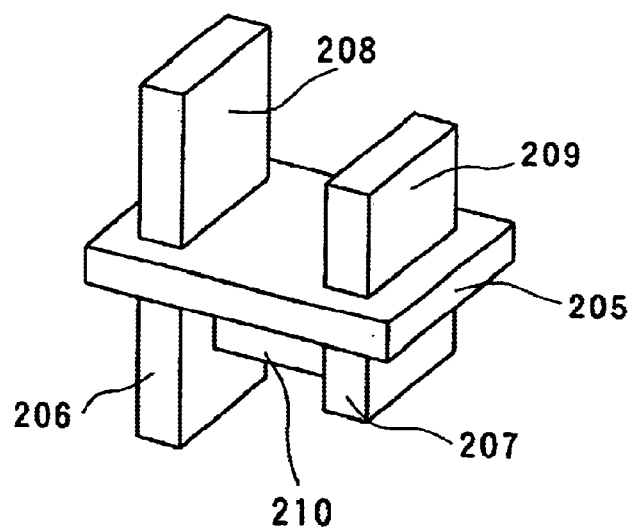

Next, a case where the three-dimensional object shown in FIG. 4A is manufactured will be described with reference to FIGS. 20A to 20I.

Figure 20A:
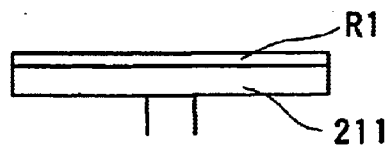
FIGS. 20A to 20I are diagrams showing a series of steps to form the three-dimensional objet of FIG. 2A by using the stereolithographic method of the present invention.
Figure 20B:
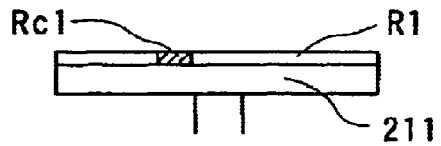

Photohardenable resin composition R1 having a melting temperature ranging from 5 to 90° C. when it is unhardened is supplied onto the mount table 211 [FIG. 20A], and then light is irradiated to the photohardenable resin composition R1 from the upper side under control to form a photohardened layer Rc1 having a predetermined pattern (the rectangular shape corresponding to the lower end surface of the leg portion 206) and a predetermined thickness [FIG. 20B].

Figure 20C:
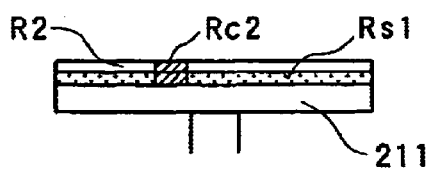
Figure 20D:
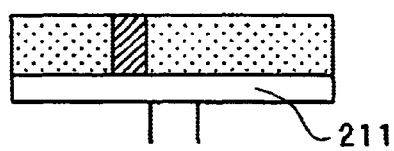
Figure 20E:
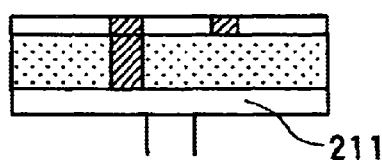
Figure 20F:
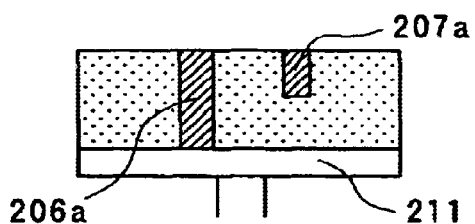
Figure 20G:
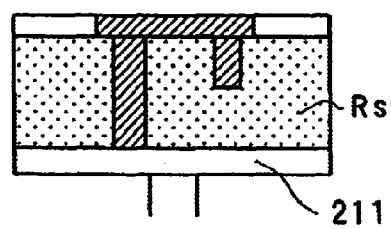
Figure 20H:
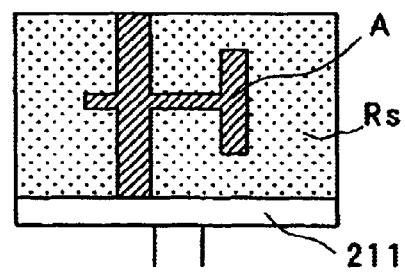
Figure 20I:
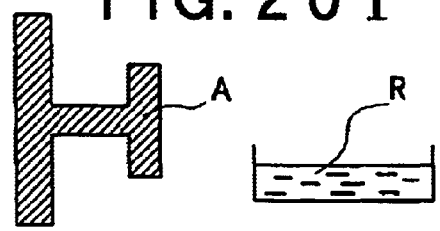

Subsequently, the unhardened photohardenable resin constituting the same surface as the photohardened layer Rc1 is cooled to be kept solid (Rs1) at a temperature less than the melting temperature thereof Thereafter, a layer of photohardenable resin is supplied onto the surface of the photohardened layer and the surface of the unhardened photohardenable resin while the unhardened photohardenable resin is kept solid, and exposed to light under control to integrally form and laminate a photohardened layer Rc2 [FIG. 20C]. The above process is repeated to complete the three-dimensional object on the mount table 211 until some midpoint of the leg portion 206 is completed [FIG. 20D]. Subsequently, the photohardenable resin is kept at a temperature less than the melting temperature to be kept solid, thereby making the photohardenable resin function as a support member. Under this state, a layer of photohardenable resin is supplied onto the surfaces of the photohardened resin and the unhardened solid photohardenable resin, and then exposed to light under control to form a photohardened layer constituting the leg portion 206 and the leg portion 207 [FIG. 20E]. Thereafter, the above step of supplying a layer of photohardenable resin on the surface of the photohardened resin layer and the unhardened solid photohardenable resin layer and then exposing light to the photohardenable resin layer under control to form a photohardened layer is repeated to form the three-dimensional object parts 206a and 207a corresponding to the leg portion 206 and the leg portion 207, respectively [FIG. 20F].

Further, a layer of photohardenable resin is supplied onto the surface of the three-dimensional object part corresponding to the leg portion 206 and the leg portion 207 and also the surface of the unhardened solid photohardenable resin constituting the same surface as the leg portion 206 and the leg portion 207 while the unhardened solid photohardenable resin is kept solid at a temperature less than the melting temperature thereof, and then the photohardenable resin layer thus supplied is exposed to light under control from the upper surface side thereof to form a rectangular photohardened layer corresponding to the lower end surface of the joint plate portion 205. This step is repeated to form the three-dimensional object part corresponding to the joint plate portion 205 [FIG. 20G]. Subsequently, the three-dimensional object part corresponding to the arm portions 208 and 209 are formed on the joint plate portion 205 in the same manner, and the desired three-dimensional object A shown in FIG. 4A is formed on the mount table 211 while it is embedded in the unhardened photohardenable resin composition Rs under cool and solid state [FIG. 20H]. Thereafter, the three-dimensional object A is heated at a temperature above the melting temperature to separate the liquid photohardenable resin R from the three-dimensional object A, and they are withdrawn [FIG. 20I].

In the above-described series of stereolithographic steps for manufacturing the three-dimensional object shown in FIG. 4A, if the unhardened photohardenable resin is made liquid before the stereolithographic process is completed, the three-dimensional object being formed is not smoothly mounted on the mount table 211 and thus falls down because the leg portion 206 and the leg portion 207 are different in length. Therefore, the overall photohardenable resin used for the stereolithographic process is preferably kept at a temperature less than the melting temperature to be kept solid.

In the foregoing description, the stereolithographic method of this embodiment is applied to the manufacturing of the three-dimensional objects shown in FIGS. 1 and 4A. However, the objects which can be manufactured by this embodiment are not limited to those shown in FIGS. 1 and 4A, and three-dimensional objects having various shapes and structures can be manufactured. For example, the method of this embodiment is effectively used to manufacture models or processing models for precise parts, electrical/electronic parts, furniture, constructive structures, car parts, various types of containers, casts, molds, masters, etc., parts for design of complicated heating medium circuits, parts for analysis and planning of the heating medium behaviors of complicated structures, and various other types of three-dimensional objects having complicated shapes and structures, particularly three-dimensional objects having overhang portions, separately-mounted portions (which are not joined to each other and separated from each other in some midpoint of the stereolithographic process), portions different in length, projecting and recess portions and three-dimensional objects having complicated structures containing curved lines or curved surfaces.

EXAMPLES

Next, an example of the present invention will be described hereunder, however, the present invention is not limited to these examples.

Synthesis Example 1

Manufacturing of Urethaneacrylate Compound 1600 g of adduct of 2-hydroxyethyacrylate and 6 moles of ε-caprolactone ("Placcel FA-6" produced by Daisel Chemical Co., Ltd.), 0.36 g of hydroxymonomethyl ether, 0.55 g of di-n-butyltindilaurate and 222 g of isophorone diisocyanate were poured into a four-necked 4-liter flask equipped with a stirrer, a temperature controller, a thermometer and a condenser, and reacted at 40 to 50° C. for 30 minutes. Thereafter, they were further reacted at a temperature of 80 to 90° C. to obtain a product (urethaneacrylate compound) to give colorless and viscous liquid having 50,000 cmpoise at the room temperature (25° C.).

Preparation Example 1

Preparation of Photohardenable Resin 200 g of the urethaneacrylate compound 1 obtained in the synthesis example 1, 600 g of morpholine acrylamide and 200 g of 2,2-bis[4-(acryloxydiethoxy)phenyl] propane were poured into a three-necked flask having an inner volume of 5 liters which was provided with a stirrer, a condenser and a dropping funnel with a side pipe, and subjected to nitrogen-substitution under reduced-pressure. Subsequently, under the UV-cut environment, they were added with 60 g of 2,2-dimethoxy-2-phenylacetone (photoinitiator for radical polymerization), and stirred at a temperature of 30° C. until they were perfectly solved (the mixing and stirring time was set to about 1 hour), thereby obtaining colorless and transparent photohardenable resin. When the photohardenable resin thus obtained was left at 20° C., it was solidified like wax. Further, when the solid material like wax was heated to 30 to 35° C., it was changed to liquid composition having fluidity.

Example 1

Three-dimensional Object by Stereolithography (1) The photohardenable resin obtained in the Preparation Example 1 was used, and water-cooled Ar laser beams (output of 500 mW; wavelength of 333,351, 364 nm) were vertically irradiated onto the surface of the photohardenable resin by using an ultra-high speed stereolithographic system ("SOLIFORM500" produced by Teijin Seiki Co., Ltd.), and a three-dimensional object having the shape and dimension shown in FIG. 1 was manufactured according to the method described with reference to FIGS. 19A to 19M under the condition: the irradiation energy of 20 to 300 mJ/cm$^2$, the slice pitch (lamination thickness) of 0.127 mm and the average stereolithographic operation time of 2 minutes. In this case, the cooling and solidification of the unhardened photohardenable resin constituting the same surface as the photohardened layer which has been already formed was performed by spraying cooled air of 10° C. to the surface of the photohardenable resin composition, and the temperature of the overall three-dimensional object mounted on the mount table was kept at 10° C. Further, when a layer of photohardenable resin was supplied onto the photohardened layer which has been already formed, the photohardenable resin was kept liquid at 40° C., and under this state the layer was formed to have an uniform thickness by using a knife coater.

(2) After the stereolithographic process of (1) is completed, the three-dimensional object was put off the mount table, transferred to an enameled butt, and put and left for 30 minutes in an air warmer of 40°. As a result, the unhardened photohardenable resin surrounding the three-dimensional object was melted and liquefied, and separated from the three-dimensional object. The three-dimensional object and the melted photohardenable resin were individually withdrawn.

(3) The three-dimensional object obtained in (2) was washed with isopropyl alcohol to perfectly remove the unhardened photohardenable resin adhering to the three-dimensional object, and then ultraviolet rays of 3KW were irradiated to the three-dimensional object for 10 minutes to post-cure the three-dimensional object.

(4) As a result, there could be obtained the three-dimensional object which was perfectly conformed with the design structure of FIG. 1 and had no hang-down and no deformation at the overhang portion (disc portion 2) and other places.

Accordingly, in the case of the method of this embodiment, even when a target three-dimensional object has an object having a complicated shape such as an overhang portion or the like, it can be smoothly obtained without separately providing a support member or without attaching any support to the three-dimensional object itself.

(5) For reference, the same operations (1) to (3) were performed to form a dumbbell specimen conformed with JIS 7113, and its dynamical characteristics were measured in conformity with JIS K 7113. As a result, tensile strength of 2 MPa, tensile elongation of 29% and tensile elasticity of 6 MPa were obtained.

According to the stereolithographic method and apparatus of this embodiment of the present invention, stereolithographic objects having complicated structures such as overhang portions, separately-mounted portions, plural leg portions different in length, projecting/recess portions, etc. can be smoothly manufactured simply and with high dimensional precision with no occurrence of hand-down, deformation, displacement, etc. and with neither disposing any support in the stereolithographic bath nor forming any supporter serving to support the three-dimensional object itself in the stereolithographic process.

Further, according to the stereolithographic method and apparatus of this embodiment, various stereolithographic objects having complicated structures such as overhang portions, separately-mounted portions, plural leg portions different in length, projecting/recess portions, etc. can be optically, smoothly and simply manufactured in a short time with simple process and apparatus, not by using any second material such as wax to support the shape of a three-dimensional object, but by using only the photohardenable resin. Still further, according to the stereolithographic method and apparatus of this embodiment, the photohardenable resin composition which does not contribute to the photohardening is heated and liquefied at a temperature above the melting temperature, whereby the liquefied photohardenable resin can be simply and smoothly separated from the three-dimensional object thus formed. In addition, the photohardenable resin thus separated can be directly reused for the subsequent stereolithographic process because it does not contain any second materials such as wax, etc.

Still further, according to this embodiment, when photohardenable resin which is solidified is supplied (coated) in the form of sheet, film or thin-film onto the mount table, or supplied to the surface of the photohardened layer which has been already formed and the surface of the cooled and solidified photohardenable resin constituting the same surface as the photohardened layer, and then exposed to light under control while the photohardenable resin is not liquefied, but kept solid in the form of sheet, film or thin-film, there does not occur any hunch which would be induced due to the surface tensile occurring in the liquid photohardenable resin, and thus the photohardenable resin can be photohardened while it is kept in a flat state. Therefore, a three-dimensional object having no rounded corner portion and having flat surfaces can be manufactured with high dimensional precision.

Still further, when photohardenable resin which is solidified is supplied (coated) in the form of solid powder onto the mount table, or supplied to the surface of the photohardened layer which has been already formed and the surface of the cooled and solidified photohardenable resin constituting the same surface as the photohardened layer, and then exposed to light under control while the photohardenable resin is not liquefied, but kept solid in the form of powder, a porous three-dimensional object can be obtained.

What is claimed is:

1. A stereolithographic apparatus for irradiating light to an unhardened photohardenable resin layer on the basis of data on stereolithography to optically form a desired three-dimensional object, characterized by comprising:

means for forming a mask on a light-transmissible member on the basis of stereolithographic data for one layer of photohardenable resin;

means for forming an unhardened resin layer of photohardenable resin, said means comprising a device for storing photohardenable resin therein and supplying the photohardenable resin thus stored to a surface on which the hardened resin layer is to be formed from only the photohardenable resin supplied from said device, and said device being located above the surface so as to be reciprocatively movable in the moving passage between a standby position and a photohardenable resin supplying position;

means for withdrawing surplus photohardenable resin that has been supplied from said device to the surface and dropped from the moving passage, said withdrawing means being located below the moving passage so as to be away from the moving passage at a distance;

means for disposing said light-transmissible member having said mask on said unhardened resin layer while said light-transmissible member is brought into close contact with said unhardened resin layer;

exposing means for exposing said unhardened resin layer to light through said mask to harden the photohardenable resin of said unhardened resin layer; and evacuating means for evacuating said light-transmissible member from said hardened photohardenable resin layer after the photohardenable resin of said unhardened resin layer is exposed to light, the desired three-dimensional object being formed by repeating the stereolithography using said respective means.

2. The stereolithographic apparatus as claimed in claim 1, wherein said light-transmissible member comprises a glass plate.

3. The stereolithographic apparatus as claimed in claim 1, wherein said exposure means comprises an exposure device for plane-exposing photohardenable resin through said mask, and said exposure device has a hood which is descended to cover said light-transmissible member when the plane-exposure is carried out.

4. The stereolithographic apparatus as claimed in claim 3, wherein said exposure device further includes a light source and a fixed casing for accommodating said light source therein, and said hood has an upper end joined to said casing and a lower end which is downwardly moved so as to freely expand and contract in the form of bellows to cover said light-transmissible member.

5. The stereolithographic apparatus as claimed in claim 4, wherein said hood is suspended by a wire, and said wire is freely would up by a motor.

6. The stereolithographic apparatus as claimed in claim 3, wherein said hood and said light-transmissible member are joined and positioned to each other when said hood is downwardly moved and covers said light-transmissible member.

7. The stereolithographic apparatus as claimed 3, further comprising a rail member which is upwardly urged by a spring member and supports said light-transmissible member so as to move said light-transmissible member freely upwardly and downwardly, and fixing means for linking said hood, said light-transmissible member and said rail member to one another when said hood is downwardly moved and covers said light-transmissible member, pushing said light-transmissible member and said rail member against the spring force of said spring member until said rail member abuts against a height positioning pin, and fixing said hood, said light-transmissible member and said rail member to the position at which said rail member abuts against said height positioning pin.

8. The stereolithographic apparatus as claimed in claim 7, further including a positioning pin which is fitted in a pin hole formed in said light-transmissible member to suppress the rotation of said light-transmissible member on the horizontal plane when said hood, said light-transmissible member and said rail member are pushed down against the spring force of said spring member.

9. The stereolithographic apparatus as claimed in claim 8, wherein said positioning pin is disposed obliquely.

10. The stereolithographic apparatus as claimed in claim 1, wherein the photohardenable resin has a melting temperature ranging from 5 to 90° C. when unhardened, and said photohardenable resin layer forming means supplies photohardenable resin onto a photohardenable resin layer that has been just before supplied and exposed to light so as to contain a hardened photohardenable resin layer and a unhardened photohardenable resin layer, while keeping the temperature at a value less than the melting temperature so that the unhardened photohardenable resin layer is kept solid to have the same surface as the hardened photohardenable resin layer, thereby forming a layer of photohardenable resin on the surface of the hardened photohardenable resin layer and the solid photohardenable resin layer.

11. A stereolithographic apparatus for irradiating light to an unhardened photohardenable resin layer on the basis of data on stereolithography to optically form a desired three-dimensional object, characterized by comprising:

means for forming a mask on a light-transmissible member on the basis of stereolithographic data for one layer of photohardenable resin;

photohardenable resin supply/forming means for successively supplying photohardenable resin of one layer to form an unhardened resin layer of photohardenable resin, said photohardenable resin supplying/forming means comprising a device for storing photohardenable resin therein and supplying the photohardenable resin thus stored to a surface on which the hardened resin layer is to be formed from only the photohardenable resin supplied from said device, and said device being located above the surface so as to be reciprocatively movable in the moving passage between a standby position and a photohardenable resin supplying position;

means for withdrawing surplus photohardenable resin that has been supplied from said device to the surface and dropped from the moving passage, said withdrawing means being located below the moving passage so as to be away from the moving passage at a distance;

a film having light transmission which is attached onto said unhardened resin layer so as to cover said unhardened resin layer in close contact with said unhardened resin layer;

means for disposing said light-transmissible member having said mask on said film while said light-transmissible member is brought into close contact with said film;

exposure means for exposing said unhardened resin layer to light through said mask to harden the photohardenable resin of said unhardened resin layer; and evacuating means for evacuating said light-transmissible member and said film from said hardened photohardenable resin layer after the exposure by said exposure means, the desired three-dimensional object being formed by repeating the stereolithography using said respective means.

12. The stereolithographic apparatus as claimed in claim 11, wherein the photohardenable resin has a melting temperature ranging from 5 to 90° C. when unhardened, and said photohardenable resin layer forming means supplies photohardenable resin onto a photohardenable resin layer that has been just before supplied and exposed to light so as to contain a hardened photohardenable resin layer and a unhardened photohardenable resin layer, while keeping the temperature at a value less than the melting temperature so that the unhardened photohardenable resin layer is kept solid to have the same surface as the hardened photohardenable resin layer, thereby forming a layer of photohardenable resin on the surface of the hardened photohardenable resin layer and the solid photohardenable resin layer.

13. A stereolithographic apparatus for irradiating light to an unhardened photohardenable resin layer on the basis of stereolithographic data to harden the photohardenable resin layer and repeating the light-irradiating operation on subsequent unhardened photohardenable resin layers in turn to optically form a desired three-dimensional object, characterized by comprising:

means for forming a mask on a light-transmissible member on the basis of stereolithographic data for one layer of photohardenable resin;

a stereolithographic table for mounting photohardenable resin thereon; coating means for successively coating photohardenable resin on said table to form each unhardened photohardenable resin layer, said coating means comprising a device for storing photohardenable resin therein and supplying the photohardenable resin thus stored to a surface on which the hardened resin layer is to be formed from only the photohardenable resin supplied from said device, and said device being located above the surface so as to be reciprocatively movable in the moving passage between a standby position and a photohardenable resin supplying position;

means for withdrawing surplus photohardenable resin that has been supplied from said device to the surface and dropped from the moving passage, said withdrawing means being located below the moving passage so as to be away from the moving passage at a distance;

film attaching means for attaching a film having light transmission onto said unhardened photohardenable resin layer;

means for superposing said light-transmissible member having said mask on said film;

exposure means for exposing the photohardenable resin of said unhardened photohardenable resin layer through said mask; and film peeling means for peeling said film after said unhardened photohardenable resin layer is exposed, the desired three-dimensional object being formed by repeating the stereolithography using said respective means.

14. The stereolithographic apparatus as claimed in claim 13, wherein said withdrawing means is located below said table to withdraw the surplus photohardenable resin dropped from said table.

15. The stereolithographic apparatus as claimed in claim 13, wherein the photohardenable resin has a melting temperature ranging from 5 to 90° C. when unhardened, and said photohardenable resin coating means supplies photohardenable resin onto a photohardenable resin layer that has been just before supplied and exposed to light so as to contain a hardened photohardenable resin layer and a unhardened photohardenable resin layer, while keeping the temperature at a value less than the melting temperature so that the unhardened photohardenable resin layer is kept solid to have the same surface as the hardened photohardenable resin layer, thereby forming a layer of photohardenable resin on the surface of the hardened photohardenable resin layer and the solid photohardenable resin layer.

16. A stereolithographic apparatus for irradiating light to an unhardened photohardenable resin layer on the basis of data on stereolithography to optically form a desired three-dimensional object, characterized by comprising:

means for forming a mask on a light-transmissible member on the basis of stereolithographic data for one layer of photohardenable resin;

means for forming an unhardened resin layer of photohardenable resin, said means comprising a device for storing photohardenable resin therein and supplying the photohardenable resin thus stored to a surface on which the hardened resin layer is to be formed from only the photohardenable resin supplied from said device, and said device being located above the surface so as to be reciprocatively movable in the moving passage between a standby position and a photohardenable resin supplying position;

means for withdrawing surplus photohardenable resin that has been supplied from said device to the surface and dropped from the moving passage, said withdrawing means being located below the moving passage so as to be away from the moving passage at a distance;

means for disposing said light-transmissible member having said mask above said unhardened resin layer;

exposing means for exposing said unhardened resin layer to light through said mask to harden the photohardenable resin of said unhardened resin layer; and evacuating means for evacuating said light-transmissible member from said hardened photohardenable resin layer after the photohardenable resin of said unhardened resin layer is exposed to light, the desired three-dimensional object being formed by repeating the stereolithography using said respective means.

17. The stereolithographic apparatus as claimed in claim 16, further comprising:

a film having light transmission which is attached onto said unhardened resin layer so as to cover said unhardened resin layer in close contact with said unhardened resin layer and means for disposing said light-transmissible member having said mask on or above said film, wherein said evacuating means evacuates said light-transmissible member and said film from said hardened photohardenable resin layer after the photohardenable resin of said unhardened resin layer is exposed to light, wherein said film is composed of a synthetic resin.

18. The stereolithographic apparatus as claimed in claim 16, further comprising:

a stereolithographic table for mounting photohardenable resin thereon;

coating means for successively coating photohardenable resin on said table to form each unhardened photohardenable resin layer;

film attaching means for attaching a film having light transmission onto said unhardened photohardenable resin layer;

means for disposing said light-transmissible member having said mask on said film; and film peeling means for peeling said film after said unhardened photohardenable resin layer is exposed, further including moving means which is disposed between said mask forming means and said stereolithographic table so as to be reciprocatively movable between said mask forming means and said stereolithographic table while said light-transmissible member is supported by said moving means.

19. The stereolithographic apparatus as claimed in claim 18, wherein said moving means comprises a rail member.

20. The stereolithographic apparatus as claimed in claim 19, wherein said rail member comprises a first rail at the mask forming means side and a second rail at the stereolithographic table side which are separated from and independent of each other.

21. The stereolithographic apparatus as claimed in claim 20, wherein said first rail comprises two rails, and said light-transmissible member is pushed from one rail to the other rail to be positioned in the width direction thereof in the process that said light-transmissible member is guided by said two rails and said mask is formed on said light-transmissible member.

22. The stereolithographic apparatus as claimed in claim 18, wherein said moving means has a belt, and said light-transmissible member has on the lower surface thereof a projection which is to be hooked to said belt, said light-transmissible member being reciprocatively moved between said mask forming means and said stereolithographic table by driving said belt.

23. The stereolithographic apparatus as claimed in claim 16, further comprising:

a stereolithographic table for mounting photohardenable resin thereon;

coating means for successively coating photohardenable resin on said table to form each unhardened photohardenable resin layer;

film attaching means for attaching a film having light transmission onto said unhardened photohardenable resin layer;

means for disposing said light-transmissible member having said mask on said film; and film peeling means for peeling said film after said unhardened photohardenable resin layer is exposed, further including a light-transmissible member standby stage at one side of said mask forming means, wherein said light-transmissible member is reciprocatively moved through said light-transmissible member standby stage, said mask forms means and said stereolithographic table in this order.

24. The stereolithographic apparatus as claimed in claim 23, wherein an operating lever is disposed over said light-transmissible member standby stage, said mask forming means and said stereolithographic table, stoppers are fixed to both the end portions of said operating lever, and said mask forming means is upwardly moved when said light-transmissible member abuts against one of said stoppers at the light-transmissible member standby stage side while said mask forming means is downwardly moved when said light-transmissible member abuts against the other stopper at the stereolithographic table side.

25. The stereolithographic apparatus as claimed in claim 16, further comprising:

a stereolithographic table for mounting photohardenable resin thereon;

coating means for successively coating photohardenable resin on said table to form each unhardened photohardenable resin layer;

film attaching means for attaching a film having light transmission onto said unhardened photohardenable resin layer;

means for disposing said light-transmissible member having said mask on said film; and film peeling means for peeling said film after said unhardened photohardenable resin layer is exposed, wherein said light-transmissible member comprises a glass plate.

26. The stereolithographic apparatus as claimed in claim 25, wherein said mask forming means comprises charging means for charging said glass plate in accordance with stereolithographic data of one layer of photohardenable resin to form a latent image on said glass plate, and developing means for coating toner onto said glass plate having the latent image formed thereon to form a mask corresponding to the data of the one layer of photohardenable resin on said glass plate.

27. The stereolithographic apparatus as claimed in claim 26, wherein said mask forming means further includes a demagnetizing head for demagnetizing the surface of said glass plate, and a toner scraper for scraping surplus toner off said glass plate.

28. The stereolithographic apparatus as claimed in claim 27, wherein said mask forming means further includes a cover for covering said toner scraper, and a toner suction hose which is connected to said cover to suck toner.

29. The stereolithographic apparatus as claimed in claim 16, further comprising:
   a stereolithographic table for mounting photohardenable resin thereon;
   coating means for successively coating photohardenable resin on said table to form each unhardened photohardenable resin layer;
   film attaching means for attaching a film having light transmission onto said unhardened photohardenable resin layer;
   means for disposing said light-transmissible member having said mask on said film; and
   film peeling means for peeling said film after said unhardened photohardenable resin layer is exposed, further including means for making parallel light incident to said light-transmissible member.

30. The stereolithographic apparatus as claimed in claim 29, wherein said means for making parallel light incident to said light-transmissible member comprises a grid provided between said exposure means and said light-transmissible member, and said exposure means irradiates light to the surface of said unhardened photohardenable resin layer at a time by using said grid.

31. The stereolithographic apparatus as claimed in claim 16, further comprising:
   a stereolithographic table for mounting photohardenable resin thereon;
   coating means for successively coating photohardenable resin on said table to form each unhardened photohardenable resin layer;
   film attaching means for attaching a film having light transmission onto said unhardened photohardenable resin layer;
   means for disposing said light-transmissible member having said mask on said film; and
   film peeling means for peeling said film after said unhardened photohardenable resin layer is exposed, wherein said exposure means includes a cylindrical lens for forming parallel light, and said exposure means is moved to expose the photohardenable resin to light.

32. The stereolithographic apparatus as claimed in claim 16, further comprising:
   a stereolithographic table for mounting photohardenable resin thereon;
   coating means for successively coating photohardenable resin on said table to form each unhardened photohardenable resin layer;
   film attaching means for attaching a film having light transmission onto said unhardened photohardenable resin layer;
   means for disposing said light-transmissible member having said mask on said film; and
   film peeling means for peeling said film after said unhardened photohardenable resin layer is exposed, wherein said exposure means includes a light source, a fixed casing for accommodating said light source therein, and a hood having an upper end joined to said casing and a lower end which is downwardly moved so as to freely expand and contract in the form of bellows to cover said light-transmissible member, and said stereolithographic apparatus further includes means which is disposed on the lower surface of said hood and serves to make parallel light to said light-transmissible member.

33. The stereolithographic apparatus as claimed in claim 32, wherein said light source of said exposure means comprises a mercury lamp, a metal halide lamp or an ultraviolet fluorescent lamp.

34. The stereolithographic apparatus as claimed in claim 32, wherein said light source of said exposure means turns on at all times, and said stereolithographic apparatus further includes a shutter which is disposed between said exposure means and said light-transmissible member and selves to control light exposure/interception to said light-transmissible member.

35. The stereolithographic apparatus as claimed in claim 34, wherein said shutter comprises a light non-transmissible sheet having a light-transmissible opening portion, and the light exposure/interception to said light-transmissible member is controlled by moving said light non-transmissible sheet.

36. The stereolithographic apparatus as claimed in claim 34, wherein said shutter comprises a light non-transmissible plate, and the light exposure/interception to said light-transmissible member is controlled by alternately changing the open/close direction of said shutter.

37. The stereolithographic apparatus as claimed in claim 16, further comprising:
   a stereolithographic table for mounting photohardenable resin thereon;
   coating means for successively coating photohardenable resin on said table to form each unhardened photohardenable resin layer;
   film attaching means for attaching a film having light transmission onto said unhardened photohardenable resin layer;
   means for disposing said light-transmissible member having said mask on said film; and
   film peeling means for peeling said film after said unhardened photohardenable resin layer is exposed, wherein said is composed of a synthetic resin.

38. The stereolithographic apparatus as claimed in claim 16, wherein the photohardenable resin has a melting temperature ranging from 5 to 90° C. when unhardened, and said photohardenable resin layer forming means supplies photohardenable resin onto a photohardenable resin layer that has been just before supplied and exposed to light so as to contain a hardened photohardenable resin layer and a unhardened photohardenable resin layer, while keeping the temperature at a value less than the melting temperature so that the unhardened photohardenable resin layer is kept solid to have the same surface as the hardened photohardenable resin layer, thereby forming a layer of photohardenable resin on the surface of the hardened photohardenable resin layer and the solid photohardenable resin layer.

39. The stereolithographic apparatus as claimed in claim 16, further comprising:
   a film having light transmission which is attached onto said photohardenable resin layer so as to cover said unhardened resin layer in close contact with said unhardened resin layer; and means for disposing said light-transmissible member having said mask on or above said film, wherein said evacuating means evacuates said light-transmissible member and said film from said hardened photohardenable resin layer after the photohardenable resin of said unhardened resin layer is exposed to light.

40. The stereolithographic apparatus as claimed in claim 39, wherein said photohardenable resin supply/forming means includes a resin supply dipper for stocking photohardenable resin and supplying photohardenable resin to form a layer of photohardenable resin, a coating blade for flattening the surface of the photohardenable resin layer thus formed, and a peeling/attaching roller for peeling said film off said hardened photohardenable resin layer and attaching said film to said hardened photohardenable resin layer while being attached, said resin supply dipper, said coating blade and said peeling/attaching roller being integrated into one unit, and the formation/flattening of said unhardened resin layer and the peeling/attaching of said film being alternately carried out by reciprocating said unit.

41. The stereolithographic apparatus as claimed in claim 40, wherein said unit is disposed between a pair of rollers between which said film is attached.

42. The stereolithographic apparatus as claimed in claim 40, wherein an usable area of said film is varied in accordance with the degree of damages of said film.

43. The stereolithographic apparatus as claimed in claim 40, wherein said unit further includes means for peeling photohardenable resin attached to the back surface of said film.

44. The stereolithographic apparatus as claimed in claim 16, further comprising:
   a stereolithographic table for mounting photohardenable resin thereon;
   coating means for successively coating photohardenable resin on said table to form each unhardened photohardenable resin layer;
   film attaching means for attaching a film having light transmission onto said unhardened photohardenable resin layer;
   means for disposing said light-transmissible member having said mask on said film; and
   film peeling means for peeling said film after said unhardened photohardenable resin layer is exposed.

45. The stereolithographic apparatus as claimed in claim 44, wherein said stereolithographic table is controlled to be moved freely downwardly every time one layer of photohardenable resin is formed.

46. The stereolithographic apparatus as claimed in claim 45, wherein said stereolithography table is disposed substantially at the center of said stereolithographic apparatus, said exposure means is disposed at the upper portion of said stereolithographic apparatus, said coating means, said film attaching means and said film peeling means are disposed at one side of said stereolithographic apparatus and said mask forming means is disposed at the other side of said stereolithographic apparatus.

47. A stereolithographic apparatus for irradiating light to an unhardened photohardenable resin layer on the basis of stereolithographic data to harden the photohardenable resin layer and repeating the light-irradiating operation on subsequent unhardened photohardenable resin layers in turn to optically form a desired three-dimensional object, characterized by comprising:
   means for forming a mask on a light-transmissible member on the basis of stereolithographic data for one layer of photohardenable resin;
   a stereolithographic table for mounting photohardenable resin thereon;
   coating means for successively coating photohardenable resin on said table to form each unhardened photohardenable resin layer, said coating means comprising a device for storing photohardenable resin therein and supplying the photohardenable resin thus stored to a surface on which the hardened resin layer is to be formed from only the photohardenable resin supplied from said device, and said device being located above the surface so as to be reciprocatively movable in the moving passage between a standby position and a photohardenable resin supplying position;
   means for withdrawing surplus photohardenable resin that has been supplied from said device to the surface and dropped from the moving passage, said withdrawing means being located below the moving passage so as to be away from the moving passage at a distance;
   film attaching means for attaching a film having light transmission onto said unhardened photohardenable resin layer;
   means for disposing said light-transmissible member having said mask above said film;
   exposure means for exposing the photohardenable resin of said unhardened photohardenable resin layer through said mask; and
   film peeling means for peeling said film after said unhardened photohardenable resin layer is exposed, the desired three-dimensional object being formed by repeating the stereolithography using said respective means.

48. The stereolithographic apparatus as claimed in claim 47, wherein the photohardenable resin has a melting temperature ranging from 5 to 90° C. when unhardened, and said photohardenable resin layer forming means supplies photohardenable resin onto a photohardenable resin layer that has been just before supplied and exposed to light so as to contain a hardened photohardenable resin layer and a unhardened photohardenable resin layer, while keeping the temperature at a value less than the melting temperature so that the unhardened photohardenable resin layer is kept solid to have the same surface as the hardened photohardenable resin layer, thereby forming a layer of photohardenable resin on the surface of the hardened photohardenable resin layer and the solid photohardenable resin layer.

49. A stereolithographic method for irradiating light to an unhardened photohardenable resin layer on the basis of stereolithographic data to harden the photohardenable resin layer and repeating the light-irradiating operation on subsequent unhardened photohardenable resin layers in turn to optically form a desired three-dimensional object, characterized by comprising:
   a step of forming a mask on a light-transmissible member on the basis of stereolithographic data of one layer of photohardenable resin;
   a step of forming one unhardened photohardenable resin layer, said forming step comprising a step of storing photohardenable resin in a dipper and supplying the photohardenable resin thus stored in the dipper to a surface on which the hardened resin layer is to be formed from only the photohardenable resin thus supplied, the dipper being located above the surface, and a step of reciprocatively moving the dipper in the moving passage between a standby position and a photohardenable resin supplying position;
   a step of withdrawing into at least one tank surplus photohardenable resin that has been supplied from the dipper to the surface and dropped from the moving passage, the tank being located below the moving passage so as to be away from the moving passage at a distance;

a step of disposing the light-transmissible member having the mask on the unhardened photohardenable resin layer while the light-transmissible member is brought into close contact with the unhardened photohardenable resin layer;

a step of exposing the unhardened photohardenable resin layer to light through the mask; and a step of evacuating the light-transmissible member after the unhardened photohardenable resin layer is exposed to light, a series of said steps being repeated in this order to form a desired three-dimensional object.

50. The stereolithographic method as claimed in claim 49, wherein the photohardenable resin has a melting temperature ranging from 5 to 90° C. when unhardened, and said photohardenable resin layer forming step comprises a step of supplying photohardenable resin onto a photohardenable resin layer that has been just before supplied and exposed to light so as to contain a hardened photohardenable resin layer and a unhardened photohardenable resin layer, while keeping the temperature at a value less than the melting temperature so that the unhardened photohardenable resin layer is kept solid to have the same surface as the hardened photohardenable resin layer, thereby forming a layer of photohardenable resin on the surface of the hardened photohardenable resin layer and the solid photohardenable resin layer.

51. A stereolithographic method for irradiating light to an unhardened photohardenable resin layer on the basis of stereolithographic data to harden the photohardenable resin layer and repeating the light-irradiating operation on subsequent unhardened photohardenable resin layers in turn to optically form a desired three-dimensional object, characterized by comprising:

a step of forming a mask on a light-transmissible member on the basis of stereolithographic data of one layer of photohardenable resin;

a step of forming an unhardened photohardenable resin layer on a stereolithographic table, said forming step comprising a step of storing photohardenable resin in a dipper and supplying the photohardenable resin thus stored in the dipper to a surface on which the hardened resin layer is to be formed from only the photohardenable resin thus supplied, the dipper being located above the surface, and a step of reciprocatively moving the dipper in the moving passage between a standby position and a photohardenable resin supplying position;

a step of withdrawing into at least one tank surplus photohardenable resin that has been supplied from the dipper to the surface and dropped from the moving passage, the tank being located below the moving passage so as to be away from the moving passage at a distance;

a step of attaching onto the unhardened photohardenable resin layer a film having light transmission which holds the unhardened photohardenable resin layer;

a step of disposing the light-transmissible member having the mask on the film while the light-transmissible member is brought into close contact with the film;

a step of exposing the unhardened photohardenable resin layer to light through the mask; and a step of evacuating the light-transmissible member and the film after the unhardened photohardenable resin layer is exposed to light, a series of said steps being repeated in this order to form a desired three-dimensional object.

52. The stereolithographic method as claimed in claim 51, wherein the photohardenable resin has a melting temperature ranging from 5 to 90° C. when unhardened, and said photohardenable resin layer forming step comprises a step of supplying photohardenable resin onto a photohardenable resin layer that has been just before supplied and exposed to light so as to contain a hardened photohardenable resin layer and a unhardened photohardenable resin layer, while keeping the temperature at a value less than the melting temperature so that the unhardened photohardenable resin layer is kept solid to have the same surface as the hardened photohardenable resin layer, thereby forming a layer of photohardenable resin on the surface of the hardened photohardenable resin layer and the solid photohardenable resin layer.

53. A stereolithographic method for irradiating light to unhardened photohardenable resin layer on the basis of stereolithographic data to harden the photohardenable resin layer and repeating the light-irradiating operation on subsequent unhardened photohardenable resin layers in turn to optically form a desired three-dimensional object, characterized by comprising:

a step of forming a mask on a light-transmissible member on the basis of stereolithographic data of one layer of photohardenable resin;

a step of forming one unhardened photohardenable resin layer, said forming step comprising a step of storing photohardenable resin in a dipper and supplying the photohardenable resin thus stored in the dipper to a surface on which the hardened resin layer is to be formed from only the photohardenable resin thus supplied, the dipper being located above the surface, and a step of reciprocatively moving the dipper in the moving passage between a standby position and a photohardenable resin supplying position;

a step of withdrawing into at least one tank surplus photohardenable resin that has been supplied from the dipper to the surface and dropped from the moving passage, the tank being located below the moving passage so as to be away from the moving passage at a distance;

a step of disposing the light-transmissible member having the mask above the unhardened photohardenable resin layer;

a step of exposing the unhardened photohardenable resin layer to light through the mask;

a step of evacuating the light-transmissible member after the unhardened photohardenable resin layer is exposed to light, a series of said steps being repeated in this order to form a desired three-dimensional object; and a step of attaching onto the photohardenable resin layer a film having a light transmission which holds the unhardened photohardenable resin layer before said step of disposing the light-transmissible member having the mask, wherein said light-transmissible member disposing step contains a step of disposing a light-transmissible member having the mask on the film while the light-transmissible member having the mask is brought into close contact with the film, and said evacuating step contain a step of evacuating the light-transmissible member and the film after the unhardened photohardenable resin layer is exposed to light.

54. The stereolithographic method as claimed in claim 53, wherein the photohardenable resin has a melting temperature ranging from 5 to 90° C. when unhardened, and said photohardenable resin layer forming step comprises a step of supplying photohardenable resin onto a photohardenable resin layer that has been just before supplied and exposed to light so as to contain a hardened photohardenable resin layer and a unhardened photohardenable resin layer, while keeping the temperature at a value less than the melting temperature so that the unhardened photohardenable resin layer is kept solid to have the same surface as the hardened photohardenable resin layer, thereby forming a layer of photohardenable resin on the surface of the hardened photohardenable resin layer and the solid photohardenable resin layer.

55. The stereolithographic method as claimed in claim 53, further comprising: a step of attaching onto the unhardened photohardenable resin layer a film having light transmission which holds the unhardened photohardenable resin layer before said step of disposing the light-transmissible member having the mask, wherein said light-transmissible member disposing step contains a step of disposing the light-transmissible member having the mask on the film while the light-transmissible member having the mask is brought into close contact with the film, and said evacuating step contains a step of evacuating the light-transmissible member and the film after the unhardened photohardenable resin layer is exposed to light, wherein there are provided a resin supply dipper for stocking photohardenable resin and supplying photohardenable resin to form a layer of photohardenable resin, a coating blade for flattening the surface of the photohardenable resin thus coated, and a peeling/attaching roller for peeling the film off said hardened photohardenable resin layer and attaching the film to said hardened photohardenable resin layer while being attached, the resin supply dipper, the coating blade and the peeling/attaching roller being integrated into one unit, and wherein when said unit is moved from one side of said stereolithographic apparatus to the other side thereof, an unhardened photohardenable resin layer is formed by the resin supply dipper while the film is peeled off by the film peeling/attaching roller, and when the unit is moved from the other side to the one side, the film is attached onto the unhardened photohardenable resin layer by the film peeling/attaching roller while the unhardened photohardenable resin layer is flattened by the coating blade.

56. A stereolithographic method for irradiating light to an unhardened photohardenable resin layer on the basis of stereolithographic data to harden the photohardenable resin layer and repeating the light-irradiating operation on subsequent unhardened photohardenable resin layers in turn to optically form a desired three-dimensional object, characterized by comprising:

a step of forming a mask on a light-transmissible member on the basis of stereolithographic data of one layer of photohardenable resin;

a step of forming an unhardened photohardenable resin layer on a stereolithographic table, said forming step comprising a step of storing photohardenable resin in a dipper and supplying the photohardenable resin thus stored in the dipper to a surface on which the hardened resin layer is to be formed from only the photohardenable resin thus supplied, the dipper being located above the surface, and a step of reciprocatively moving the dipper in the moving passage between a standby position and a photohardenable resin supplying position;

a step of withdrawing into at least one tank surplus photohardenable resin that has been supplied from the dipper to the surface and dropped from the moving passage, the tank being located below the moving passage so as to be away from the moving passage at a distance;

a step of attaching onto the unhardened photohardenable resin layer a film having light transmission which holds the unhardened photohardenable resin layer;

a step of disposing the light-transmissible member having the mask above the film;

a step of exposing the unhardened photohardenable resin layer to light through the mask; and a step of evacuating the light-transmissible member and the film after the unhardened photohardenable resin layer is exposed to light, a series of said steps being repeated in this order to form a desired three-dimensional object.

57. The stereolithographic method as claimed in claim 56, wherein the photohardenable resin has a melting temperature ranging from 5 to 90° C. when unhardened, and said photohardenable resin layer forming step comprises a step of supplying photohardenable resin onto a photohardenable resin layer that has been just before supplied and exposed to light so as to contain a hardened photohardenable resin layer and a unhardened photohardenable resin layer, while keeping the temperature at a value less than the melting temperature so that the unhardened photohardenable resin layer is kept solid to have the same surface as the hardened photohardenable resin layer, thereby forming a layer of photohardenable resin on the surface of the hardened photohardenable resin layer and the solid photohardenable resin layer.

\* \* \* \* \*